United States Patent
Orfaig et al.

(10) Patent No.: US 10,257,456 B2
(45) Date of Patent: Apr. 9, 2019

(54) HARDWARE FRIENDLY VIRTUAL FRAME BUFFER

(71) Applicant: SAMSUNG ELECTRONICS CO., LTD., Suwon-si, Gyeonggi-Do (KR)

(72) Inventors: Ariel Orfaig, Kfar Bin-Nunn (IL); Nathan Henri Levy, Givatayim (IL)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 22 days.

(21) Appl. No.: 15/697,972

(22) Filed: Sep. 7, 2017

(65) Prior Publication Data
US 2019/0075271 A1    Mar. 7, 2019

(51) Int. Cl.
| | |
|---|---|
| *H04N 5/378* | (2011.01) |
| *H04N 5/917* | (2006.01) |
| *H04N 5/335* | (2011.01) |
| *G06F 12/10* | (2016.01) |
| *H04N 5/911* | (2006.01) |
| *G06F 12/1018* | (2016.01) |

(52) U.S. Cl.
CPC ......... *H04N 5/378* (2013.01); *G06F 12/1018* (2013.01); *H04N 5/917* (2013.01); *G06F 2212/401* (2013.01); *H04N 5/335* (2013.01); *H04N 5/911* (2013.01)

(58) Field of Classification Search
CPC ........ H04N 5/378; H04N 5/917; H04N 5/335; H04N 5/911; G06F 12/1018; G06F 2212/401
See application file for complete search history.

(56) References Cited

U.S. PATENT DOCUMENTS

| | | |
|---|---|---|
| 7,370,054 B1 | 5/2008 | Martin et al. |
| 2008/0082790 A1 | 4/2008 | Diyankov et al. |
| 2016/0093273 A1* | 3/2016 | Wang ...................... G01S 3/781 345/428 |
| 2016/0259724 A1 | 9/2016 | Steele, Jr. et al. |
| 2017/0127005 A1* | 5/2017 | Park .................... G06F 12/1018 |
| 2017/0213105 A1* | 7/2017 | Ji ............................ G06K 9/20 |
| 2018/0137639 A1* | 5/2018 | Zou ...................... H04N 13/128 |
| 2018/0137647 A1* | 5/2018 | Li ........................ G06K 9/4671 |
| 2018/0137673 A1* | 5/2018 | Shi ........................ G06K 9/6202 |
| 2018/0174323 A1* | 6/2018 | Ji .............................. G06T 7/74 |
| 2018/0191972 A1* | 7/2018 | Berner ...................... G01J 1/46 |
| 2018/0295298 A1* | 10/2018 | Zamir .................... H04N 5/353 |
| 2018/0308253 A1* | 10/2018 | Ryu .......................... G06T 7/80 |

* cited by examiner

*Primary Examiner* — Shahbaz Nazrul
(74) *Attorney, Agent, or Firm* — F. Chau & Associates, LLC

(57) ABSTRACT

Embodiments of a virtual frame buffer (VFB) for buffering asynchronous data originating from an imaging source such as a dynamic vision sensor. The VFB may include a hash table memory, a data memory, and a control unit. The control unit receives an input address of an asynchronous data event and determines a pseudo-randomly computed hash of the hash table memory at which to store the input address. The control unit links the hash to a handle corresponding to a data memory cell that stores pixel data of the event. The VFB may interface like a full frame buffer, but use significantly less memory. The VFB may be used with a pixel processing algorithm to search for recent events in a localized environment of a pixel.

20 Claims, 15 Drawing Sheets

FIG. 10

HARDWARE FRIENDLY VIRTUAL FRAME BUFFER

BACKGROUND

Technical Field

The present disclosure relates generally to data buffering, and more particularly, to a virtual frame buffer for handling sparse asynchronous event based data.

Discussion of the Related Art

Traditional frame buffers for video operate by buffering raw pixel data or compressed data raster scanned for each frame, thereby requiring a large memory allocation. In some applications such as computer vision, however, the image or other event based data is sparse. For these cases, sensing techniques have recently been developed to provide sparse asynchronous based data rather than traditional raster scanned data.

A Dynamic Vision Sensor (DVS) is an example of a sensor that generates data in random locations in a frame over time. Each time a pixel's value changes, the DVS may "fire" to output an "event", which may be in the form of a time stamp, a pixel or pixel block address, and a pixel value representing a new gray scale or color value for that pixel. A signal processing system may then update a previously recorded/computed frame with the updated pixel values received since the last frame, and thereby generate a temporally succeeding frame so as to reconstruct real world video.

In video signal processing, many pixel processing algorithms require access to pixel data of a local environment of a pixel of interest. The local environment is referred to as a patch, which is a block of contiguous pixels neighboring (and typically including) the pixel of interest. In some cases, access is required to pixel locations in the frame beyond the local environment. With traditional raster scan sensors there are relatively inexpensive hardware (HW) techniques to handle these algorithmic-dependent requirements. However, in a DVS system, due to the location randomness of the incoming data, those HW techniques don't work well and the alternative is to use expensive solutions like frame buffers and DRAM.

SUMMARY

The presently disclosed technology provides a technique for reducing the amount of memory which is generally required by hardware oriented algorithms that work on sparse asynchronous event based data. The technology may parallelize and simplify access to an event local environment (patch) during processing.

The technology may serve to supply an interface of an expensive technique, but practically use relatively inexpensive hardware and processing.

Embodiments of a virtual frame buffer (VFB) for buffering asynchronous data originating from a video source such as a dynamic vision sensor are provided. The VFB may include a hash table memory, a data memory, and control circuitry (e.g. a control unit). The control circuitry may receive an input address of an asynchronous image data event and determine a pseudo-randomly computed hash of the hash table memory at which to store the input address. The control circuitry may link the hash to a handle of the data memory where data of the image data event is stored.

The VFB may interface like a full frame buffer, but use significantly less memory. The VFB may be used with a pixel processing algorithm to search for recent events in a localized environment of a pixel.

In another aspect, an image processing system includes: a dynamic vision sensor (DVS) configured to output asynchronous data events; a virtual frame buffer; and a processing and storage system. The virtual frame buffer may include: a hash table memory; a data memory; and control circuitry configured to receive an input address of an asynchronous image data event of the DVS, determine a pseudo-randomly computed hash of the hash table memory at which to store the input address, based on a hash function; and link the hash to a handle of the data memory where data of the image data event is stored. The processing and storage system may be configured to execute a pixel processing program that sends a recent event search command, corresponding to a pixel address, to the virtual frame buffer to search for a recent event at that pixel address. The virtual frame buffer may respond with a recent event search result obtained by searching hashes of the hash table for the pixel address using the hash function, and outputting image data from the data memory corresponding to the pixel address if found in the searched hashes.

In yet another aspect, a frame buffering method includes: receiving an input address of an asynchronous data event corresponding to an image collection cell of an image sensor; determining a pseudo-randomly computed hash of a hash table memory at which to store the input address; storing at least image data of the asynchronous data event at a data memory cell defined by a handle; and linking the hash stored in the hash table memory to the handle.

A non-transitory computer readable recording medium may store instructions that, when executed by at least one processor, implement the frame buffering method.

BRIEF DESCRIPTION OF THE DRAWINGS

The above and other aspects, features and advantages of the present technology will become more apparent from the following detailed description, taken in conjunction with the accompanying drawings in which like reference numerals indicate like elements or features, wherein:

FIG. 10 illustrates examples of hash table and linked list memory structures, and a working example of how an input data sequence may be handled using a linked list control unit.

DETAILED DESCRIPTION

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the claimed subject matter, but these details are to be regarded as merely illustrative. For the purposes of simplicity and clarity, descriptions of well-known functions and constructions may be omitted when their inclusion may obscure appreciation of the present technology by a person of ordinary skill in the art.

Figure 1A:
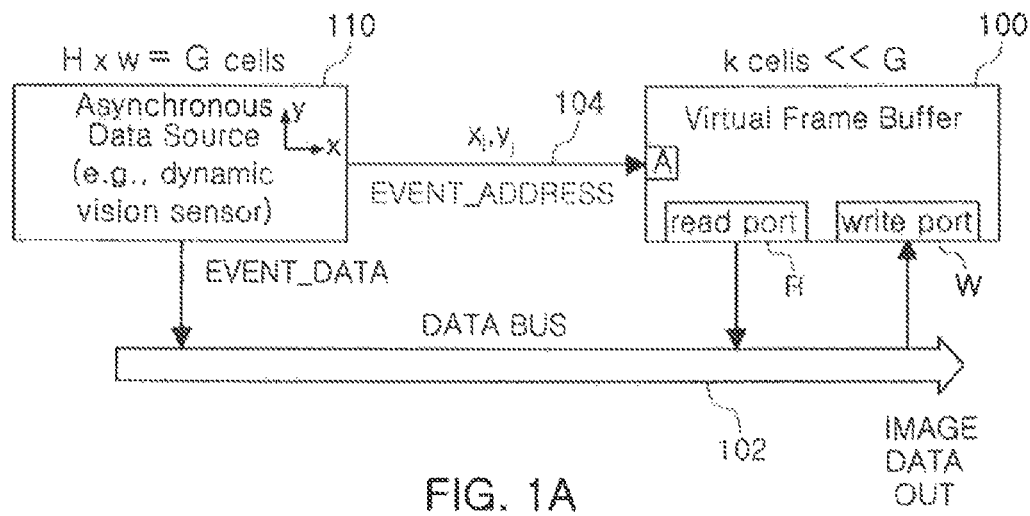
FIG. 1A illustrates an example of a top level interface arrangement employing a virtual frame buffer (VFB) according to the present technology.

FIG. 1A illustrates an example of a top level interface arrangement employing a virtual frame buffer (VFB) according to the present technology. In this example, a VFB 100 is directly coupled to an asynchronous data source, hereafter exemplified as a dynamic vision sensor (DVS) 110. DVS 110 may have a grid of image collection cells arranged in x and y directions. Each cell contains a pixel or tile (a group of pixels) currently representing a captured image element of a real world scene. Hereafter, for simplicity, each cell will be exemplified as representing a single pixel, and each DVS 100 cell may interchangeably be called a pixel. The grid may be formed of G=H×W cells (height×width in unit cells), whereas VFB 110 may have K<<G data cells, each storing data of one pixel. By way of a few examples, K may be at least an order of magnitude less than G, and be in the range of 1-2%, 1-5% or 1-10% of G. Thus, VFB 100 is composed of significantly less memory than a full frame memory ("regular" memory), yet supplies an interface that behaves similar to a regular memory through methods described hereafter.

VFB 100 may supply an interface to a data bus 102 connected to an external device (not shown in FIG. 1A) for some given address $x_i$, $y_j$ representing a DVS 110 cell. In the "single pixel mode" example of FIG. 1A, the interface to data bus 102 is through read and write ports R and W while event addresses are received directly from DVS 110 via an address bus 104. In particular, DVS 110 may asynchronously output captured image data "event_data" of an event in packets to data bus 102 while the corresponding address "event_address" of the event is supplied to an address port A of VFB 100. In a write mode, the external device may command that the data be written to VFB 100, through data bus 102. More specifically, DVS 110 may "fire" asynchronously to output a data event of a particular pixel, whenever a color/gray scale value of that pixel changes by at least a threshold amount. The address (in coordinates) $x_i$, $y_j$ of the pixel, and the data of the event, e.g., a new color value for that pixel and a time stamp at which the event occurred, may be provided respectively on address bus 104 and data bus 102. If many pixels change values simultaneously, a system with a sufficiently fast clock speed can still output enough pixel information to adequately reproduce changes in an image or estimate motion, etc., for a particular application.

VFB 100 buffers the event_data allows for random access to the data by the external device. During a read mode, VFB 100 searches its memory for recent data corresponding to requested addresses (received at address port A) and outputs results on data bus 102.

Figure 1B:
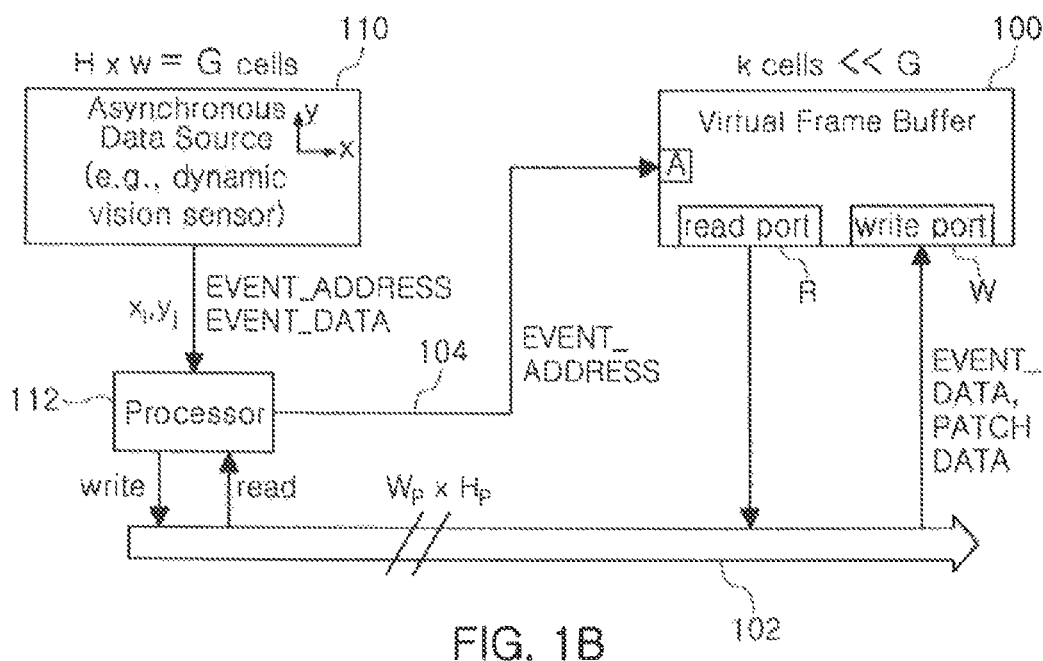
FIG. 1B illustrates another example of a top level interface arrangement employing a VFB.

FIG. 1B illustrates another example interface arrangement employing a VFB. In this example, DVS 110 does not supply the event_address directly to VFB 100 but instead supplies both the event_address and the event_data to a processor 112. Processor 112 provides the event_address to VFB 100 via an address and control line (or lines) 104 and provides both the event_data and additional data to VFB 100 via data lines of bus 102. To this end, processor 112 may generate, based on image data of an event from one cell $x_i$, $y_j$, simulated image data for a patch of DVS cells of size $W_P \times H_P$ on data bus 102. Data for the entire patch of DVS cells may be supplied by processor 112 to VFB 100 prior to supplying VFB 100 data for the next event. Accordingly, "patch-based" data allocation and fetching of $W_P \times H_P$ cells may be implemented via data bus 102 in this manner. Note that in the various figures herein, bus-related notation such as "$W_P \times H_P$" with multiple intersecting slashes on the bus is not necessarily an indication of $W_P \times H_P$ parallel data lines but may denote patch-based allocation and fetching operations that may occur on the bus. $W_P \times H_P$ may be considered a maximum patch size that may be requested in parallel. Patch-based access may use both serial and parallel data communication. As an example, a given input address $x_i$, $y_j$ (the event_address) may be the coordinates of an "event pixel", i.e., the DVS pixel involved in the asynchronous data event, at a predefined position of the patch, such as the upper right corner of a square patch, and this single address (or corresponding "index", discussed below) may be supplied to VFB 100 to represent the patch. Processor 112 may also be part of a system that subsequently reads the data from VFB 100 during execution of a pixel processing algorithm.

Figure 2:
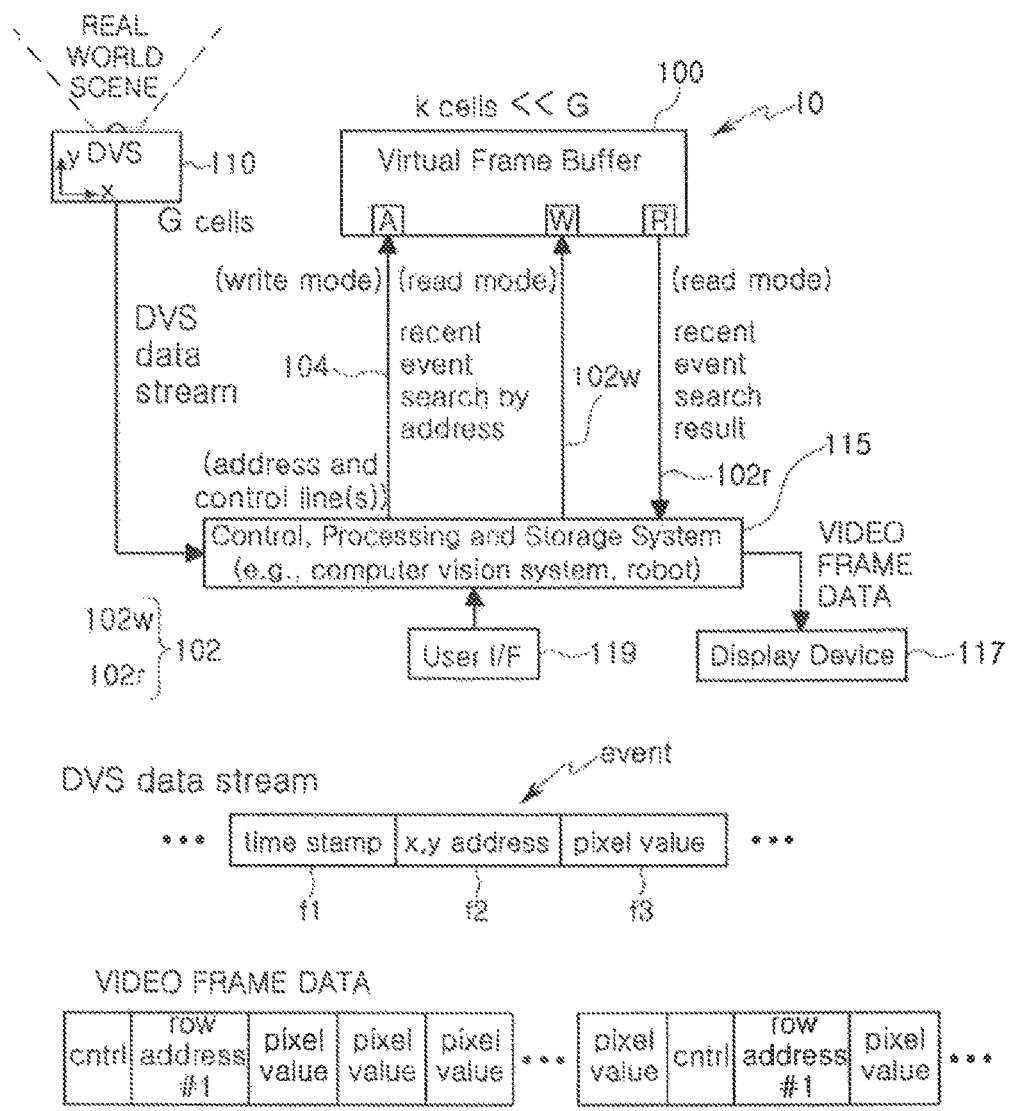
FIG. 2 depicts an exemplary video processing system employing the VFB.

FIG. 2 depicts an exemplary video processing system, 10, employing a VFB. Image data of a scene captured by DVS 110 may be output to a control, processing and storage ("CPS") system 115 in the form of asynchronous events corresponding to changes in the scene. CPS system 115 in turn controls the writing of this image data (the event_data) in VFB 100 during a write mode, similar to the processor 112 operations discussed above. CPS system 115 may for example be part of a computer vision system such as a robot that processes the data so as to recognize objects and track motion/relative distance of objects. In addition to the recent event searching functions discussed below, CPS system 115 may convert the DVS data stream received from DVS 110 to video frame data suitable for displaying on an optional display device 117 and/or for further processing. CPS system 115 may also perform operations responsive to commands received from a user interface 119. All the elements of video processing system 10 may be integrated in a common computer vision system.

Each pixel event output by DVS 110 may be provided in the form of a packet which, in an example, may have a time stamp in field $f_1$, an x, y pixel address (the event_address) in field $f_2$, and a pixel value (expressed in gray scale or color bits) in field $f_3$. Alternatively, the event_address of the DVS data stream may be output on a dedicated address line, synchronized with the pixel value or time stamp fields, but not part of a packet frame structure with other data. The asynchronous data may be output from the DVS in any suitable packet structure. Buffered packets in the same or a similar structure may be output by VFB 100 to CPS system 115. In the case of outputting video to a display device 117, system 115 may use the data packet information to render video data frames for output (where D/A conversion to output video signals may be performed either by CPS system 115 or display device 117). In the case of a computer vision system, CPS system 115 may only require asynchronous data and may not necessarily convert the same to video to be displayed. When video is generated for output, rendered video frame data may be provided in a conventional, raster scanned format. For instance, a frame may be rendered by first constructing a reference frame (e.g. at time $t_0$) with pixels of all black color values. Suppose that a first event is received corresponding to a pixel at address $x_i$, $y_j$ and recorded with a time stamp between $t_0$ and $t_1$ (the next frame display time), and has a pixel value of v1. A first frame corresponding to time $t_1$ may then be constructed with the pixel at address $x_i$, $y_j$ changing to the value v1 while other pixels for which no events were received between $t_0$ and $t_1$ remain black. In this manner, images and motion captured by DVS 110 may be constructed and output frame by frame as video. (As seen in the exemplary video frame data structure of FIG. 2, such video frame data may be output to display device 117 for all pixels row by row.)

The data bus 102 may be comprised of write lines 102w and read lines 102r. CPS system 115 may write DVS data and any patch data it generates according to the patch-based scheme discussed above, by setting a read/write (r/w) control bit on address and control line(s) 104 to a write mode value, and providing the data on write lines 102w. In a read mode, the r/w control bit is changed to a read mode value.

In accordance with embodiments disclosed herein, CPS system 115 may execute an image processing algorithm that needs to dynamically perform an address based search for recent events stored in VFB 100. As mentioned earlier, VFB 100 is configured with a number of data memory cells where the number is an order of magnitude smaller than the number of addresses of DVS 110. The small memory, in conjunction with a pseudo random access scheme using a hash table memory/hash function with a linked list, reduces cost and allows for fast memory access. Thus, VFB 100 may be configured with a data memory of K cells<<G cells of DVS 110. As further examples to those above, DVS 110 might have 100×100=10,000 cells while VFB 100 may have a data memory of 100-200 cells, which is only 1-2% of the DVS cells. In another case, DVS 100 might have 1K×1K=1M cells while VFB 100 has 5,000-30,000 data memory cells, or 0.5-3% of the DVS cells. These, of course, are just examples illustrating possible scenarios. The number of data memory cells in VFB 100 may be designed according to the particular application requirements.

For the dynamic event search, in general, CPS system 115 effectively searches for a recent event corresponding to a particular pixel address of the DVS by initiating the read mode and providing the address of interest on the address line 104. VFB 100 may search its small memory to determine if the event occurred, and may respond with a recent event search result on read lines 102r providing the recent pixel value at the requested address if it exists in the memory. In the case of patch-based searching, data for pixels of an entire patch, associated with a first pixel address $x_i$, $y_j$, may be concurrently searched in parallel. All data relevant to the patch may be read out in parallel. Note that in some embodiments, the size of the patch and may be initially fixed and known beforehand by VFB 100 such that no additional command for a patch size is sent. In other embodiments, the size of the patch may be dynamically set, and this may be done through the use of dedicated bits/lines on address and control line(s) 104. By way of example only, if 32 bits are allocated for a command on address and control line(s) 104, 1 bit may be used for an ACCESS_MODE (W/R) command to set the write or read mode; 25 bits may be used to supply an EVENT_ADDRESS (providing the first pixel address $x_i$, $y_j$); and 6 bits may be used for a PATCH_SIZE command in a dynamic mode. Any suitable number of bits/lines may be allocated on line 104 to communicate such control and address information. The number of lines may equal the number of bits. Alternatively, the number of lines may be less than the number of bits (in which case at least some of the information is provided serially). Hereafter, address and control line(s) 104 will be referred to as "address line 104" for brevity.

Such recent event searching and retrieval is useful in a variety of pixel processing algorithms. As one example, a video noise reduction algorithm may operate by dynamically determining whether an event associated with a single pixel or a small number of pixels is noise. The event may be assumed to be noise if it is detected as an isolated event. An isolated event can be determined if no other recent events (or a number of events less than a predetermined threshold within a predetermined recent time period) are detected within a local environment of the pixel such as a predefined, local patch of pixels. Hence, when an event is initially detected for a pixel at an address $x_P$, $y_q$, the processing algorithm executing in system 15 may send a recent event search command to VFB 100 requesting any recent pixel data for addresses within a certain range of $x_P$, $y_q$. If none are reported to exist in the small data memory of VFB 100, and the check is repeated after a certain number of additional events are received, the event for the pixel at $x_P$, $y_q$ may be discarded as noise.

Another example application for recent event searching is "patch matching" which involves matching patches from two dynamic vision sensors. For instance, a stereo camera system may employ left and right DVS sensors for 3D video capture. Objects within images captured by the left and right DVS sensors may be compared in order to match objects, and a left image/right image displacement between the objects may be used to compute a depth of the object from the camera. When an event at a patch address in one of these sensors is detected through a first VFB, addresses may be immediately searched by accessing a second VFB coupled to the other sensor, to ascertain where a similar event occurred.

System 10 of FIG. 2 is shown and described above as utilizing an arrangement as in FIG. 1B in which DVS 110 has no direct connection to VFB 100. Alternatively, system 10 may use the arrangement as in FIG. 1A for a single pixel mode, where an event_address for a single pixel is supplied directly to VFB 100. In this case, CPS 115 may still supply control signaling to control read and write operations of VFB 100.

Thus, embodiments of VFB 100 supply an interface that may appear as a full frame buffer (long memory) while practically using a much shorter memory size. Due to the small memory size, however, if a large number of events are output by the DVS in bursts, performance may suffer. Therefore, in some examples, a VFB 100 configuration will be suitable to meet certain performance requirements as long as the usage environment satisfies the following three factors:

1) The asynchronous event based data is sparse enough. In other words, the ratio between the actual memory size (e.g., the number of DVS cells) and the virtual memory size (interface) can be designed depending on an expected sparsity factor of the input data. Under the conditions of events obsolescence (where older events become discarded), the sparser the input data, the more similar the behavior of the VFB will be to that of a full frame buffer. Behavior of the VFB more closely resembles a full frame buffer for applications that only require very recent events, e.g. a few milliseconds, and the input is sparse enough (with minimal or no bursts).

2) Some amount of data losses are tolerable to the user. That is, data losses to the buffer memory may occur in certain VFB configurations that are lossy by design. (Data loss might occur in the VFB data memory which is searched for recent events, but not necessarily in a larger system memory, e.g., in a memory of system 15 of FIG. 2.) According to a mechanism in some embodiments, while it is desirable to register each new event, there is some probability (depending on the designed architecture) that the registration will rejected.

3) The user can tolerate some history losses in the recent event analysis. Since the VFB is only an interface to a full frame buffer and does not actually have a long memory as does a full frame buffer, then at some point the actual short memory will be filled. In some cases, registering a new event may override some old event (e.g. if the new event is from the same pixel address as one already stored, and the memory is filled).

Figure 3A:
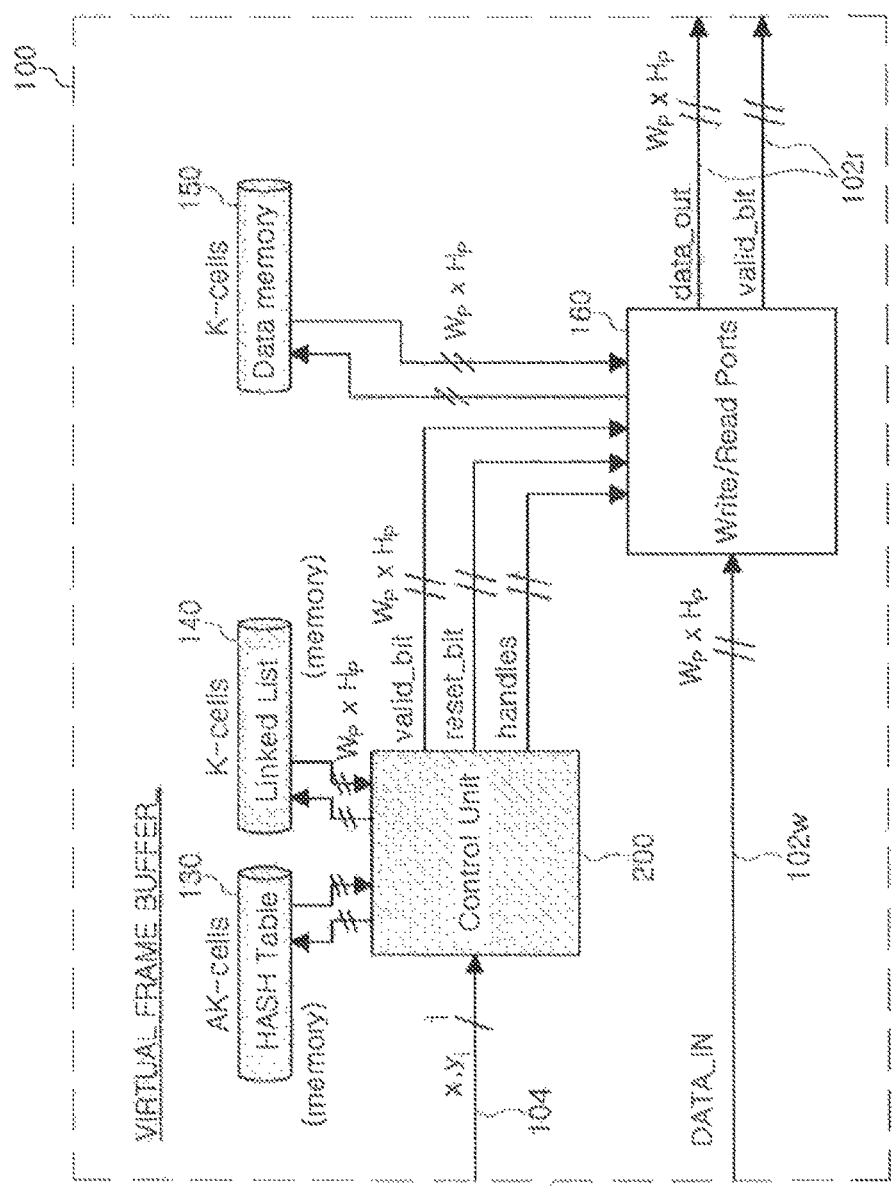
FIG. 3A is a block diagram of an exemplary VFB.

Referring now to FIG. 3A, a block diagram of an exemplary VFB 100 is illustrated. VFB 100 may include a control unit 200, a hash table memory 130, a linked list memory 140, read/write ports 160, and a data memory 150 for storing pixel data. (Data memory 150 is shown as a separate entity, but may be embedded with linked list memory 140, for example.) Data memory 150 may store pixel data at "handles" (addresses of data memory 150) linked to "hashes", i.e., addresses of cells in hash table 130, which in turn store address information of DVS pixels corresponding to the pixel data.

In further detail, a pixel address in the sensor may be expressed as x,y coordinates, and may be coded as an "index". This may be understood by referring momentarily to FIG. 7C, which illustrates a simple example of a sensor with 300 cells arranged in a grid, having a width W of 20 cells and a sensor height H of 15 cells. In this case, pixel coordinates range from 0,0 for the first cell in the upper left corner of the grid to 19, 14 for the 300$^{th}$ cell at the bottom right corner. The first cell at coordinates 0,0 is mapped to an index value of "0" and the last cell, at coordinates 19, 14 is mapped to an index value of 299. Thus, the term "index" or "pixel index" as used herein should be understood in this context as being a value representative of an image capture cell location in a sensor.

Control unit 200 generates the handles and stores these in linked list memory 140 for such linking of data memory cells to hash table cells. When data memory 150 fills up, it may generally output data to an external processing system (e.g., system 15) on a FIFO (First In, First Out) basis. In some cases, discussed later, when an event is received for a pixel coordinate for which data is already stored in data memory 150, i.e., before that data was read out, the previous data may be overwritten.

In embodiments, the number of cells (K cells) in each of data memory 150 and the linked list memory 140 are identical. The number of cells in hash table memory 130 may be larger by a constant factor A, so that hash table 130 contains AK cells. The value for "A" may be set according to the requirements of a specific application. In general, A is >1. In some examples, the value A is approximately 2. In another example, A may in a range of about 1.5 to 3. As explained further below, a probability of a successful allocation of an event may depend on the value set for A.

Figure 3B:
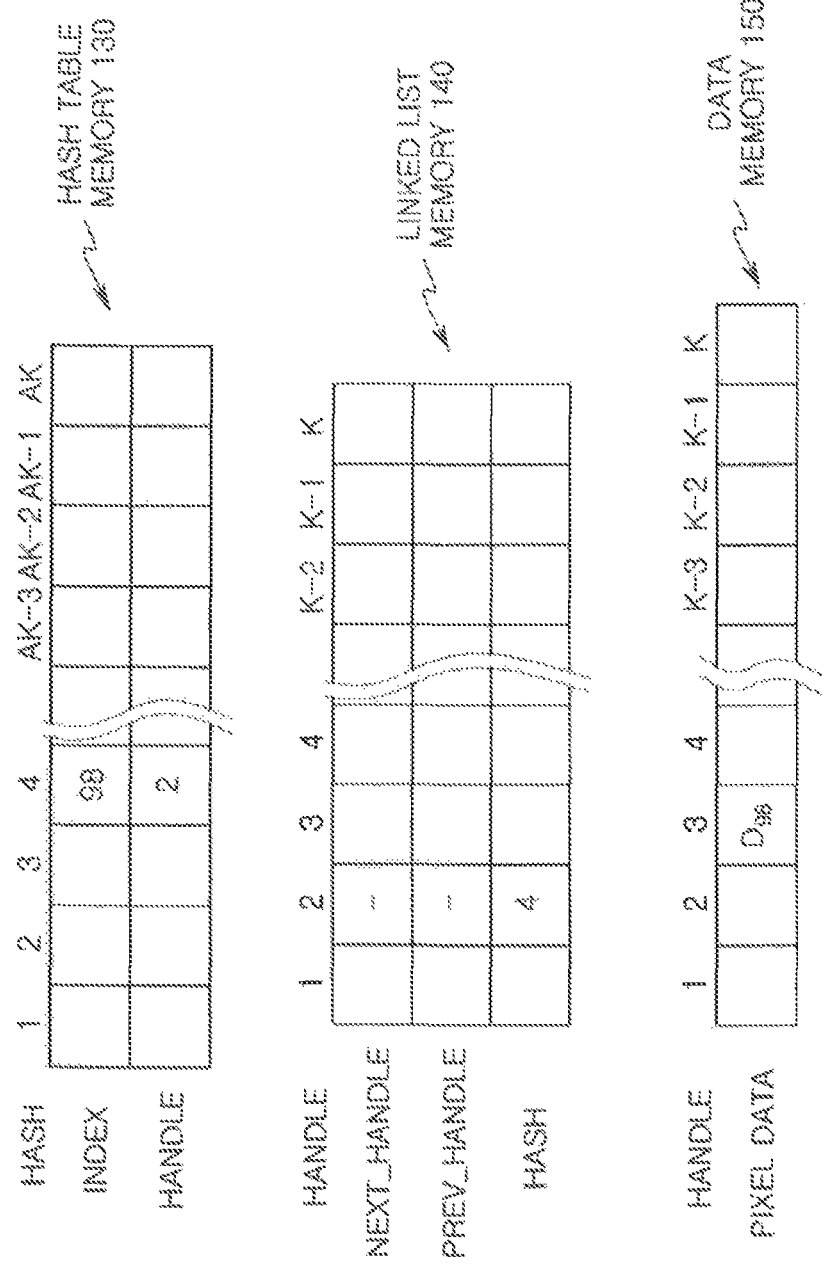
FIG. 3B depicts examples of data structures of memories within the VFB of FIG. 3A and types of data stored therein.

Referring to FIG. 3B, examples of data structures of the various memories of VFB 100, as well as types of data stored therein, are shown. Hash table memory 130 may have AK cells, where each cell is identified by a hash (labeled 1 to AK). Each cell may have two fields; a first field that stores an index corresponding to a pixel address as noted above, and a second field that stores a handle. The handle may identify a cell (address) in the linked list memory 140 and also identify a cell with the same address in the data memory 150. The index corresponds to a pixel for which pixel data is concurrently stored within a cell of data memory 150.

Linked list memory 140 may have K cells, each identified by a handle (labeled 1 to K). Each cell may have three fields: a "hash" field, a Next_Handle field and a Previous_Handle field. The hash field identifies a hash in hash table memory 130, where pixel data associated with the index stored at the hash is stored at the same handle in the data memory 150. The Next_Handle field identifies a handle at which the next data event was stored, while the Previous_Handle field identifies a handle at which the previous data event was stored. (In the case of "contemporaneous" writing of pixel data using pixel data generated by processor 112 in FIG. 1B of a W$_P$×H$_P$ patch, the next and previous data events may each be a simulated data event for a pixel within the patch. In other words, although all pixels of a patch may be considered to be written contemporaneously—prior to VFB 100 receiving a new data event from DVS 110—the pixel data may still be written sequentially within a short time span, such that the Previous_Handle and Next_Handle fields may point to a data field of another pixel of the patch. Patch data may be read/written in parallel, i.e., simultaneously within a single clock period.)

In embodiments, data memory 150 also has K cells (labeled 1 to K), where each cell may have a single data field for storing pixel data of the pixel corresponding to the linked hash. Thus, for example, as shown in FIG. 3B, if an index 98 is stored at hash #4 of hash table memory 130, and the handle assigned to this event is handle #2, these values are written in the respective fields of hash cell #4. Concurrently, a hash value of 4 is written in the hash field of linked list memory 140 at the handle #2, and the pixel data for the index 98 ("D$_{98}$") is written at the handle #2 of the data memory 150. (An example of writing link values to the Next_handle and Previous_Handle fields is given later in connection with FIG. 10.)

Returning to FIG. 3A, as noted earlier, the bus-related notation W$_P$×H$_P$ refers to patch-based processing that may occur on the associated bus line (W, H=width, height of a patch in units of pixels). However, in some cases, the present technology is useful for pixel allocation and fetching on the single pixel level, in which case P=1 and W$_P$×H$_P$=1. That is, a pixel processing algorithm may search for the presence of pixel data pixel by pixel, whether via the arrangement of FIG. 1A or that of FIG. 1B with W$_P$×H$_P$=1. In this case, the pixel coordinates xi, yj may be extracted by control unit 200 from the address and may derive an index of the "event pixel" correlated with xi, yi. In the case of patch-level processing (arrangement of FIG. 1B) the pixel data may be provided on write lines 102w while a pixel address or index of the "event pixel" at xi, yj (e.g. the upper right corner of the patch) is input to control unit 200 on address lines 104. In either case, control unit 200 may return three outputs: the above-discussed handle(s), a 'reset-bit' and a 'valid-bit'. The reset-bit and valid-bit are control bits that supply to the write/read ports instructions of how to use the corresponding handle in relation to data memory 150. For patch-based processing ($W_P \times H_P >= 2$), a memory access (i.e., memory allocation or fetch) is done concurrently or consecutively for two or more pixels constituting a patch, for faster processing. An executing pixel processing program may define a patch size for local environment searching, for example. The control bits control the allocation/fetching of the patch pixels accordingly. (Note that during the fetching process, for either a single pixel search of a patch-level search for pixels within a patch, a search command for a particular pixel address may be effectively provided to control unit 200 by providing the address on address line 104 and setting the r/w control bit to the read mode. In the case of the patch-level search, a patch-based search is desired, but may only provide a single pixel address may be provided. A processing program executing in control unit 200 may know beforehand the size of the patch and the predetermined reference position of the pixel within the patch, and thereby determine the patch members to be searched for accordingly. This obviates the need to receive a separate pixel address for each patch member to be searched for. Note that the notation "1" on line 104 in FIG. 3A in indicative of a single address, not necessarily a single bit line, since the address may be spread across several bit lines in parallel.)

Figure 4A:
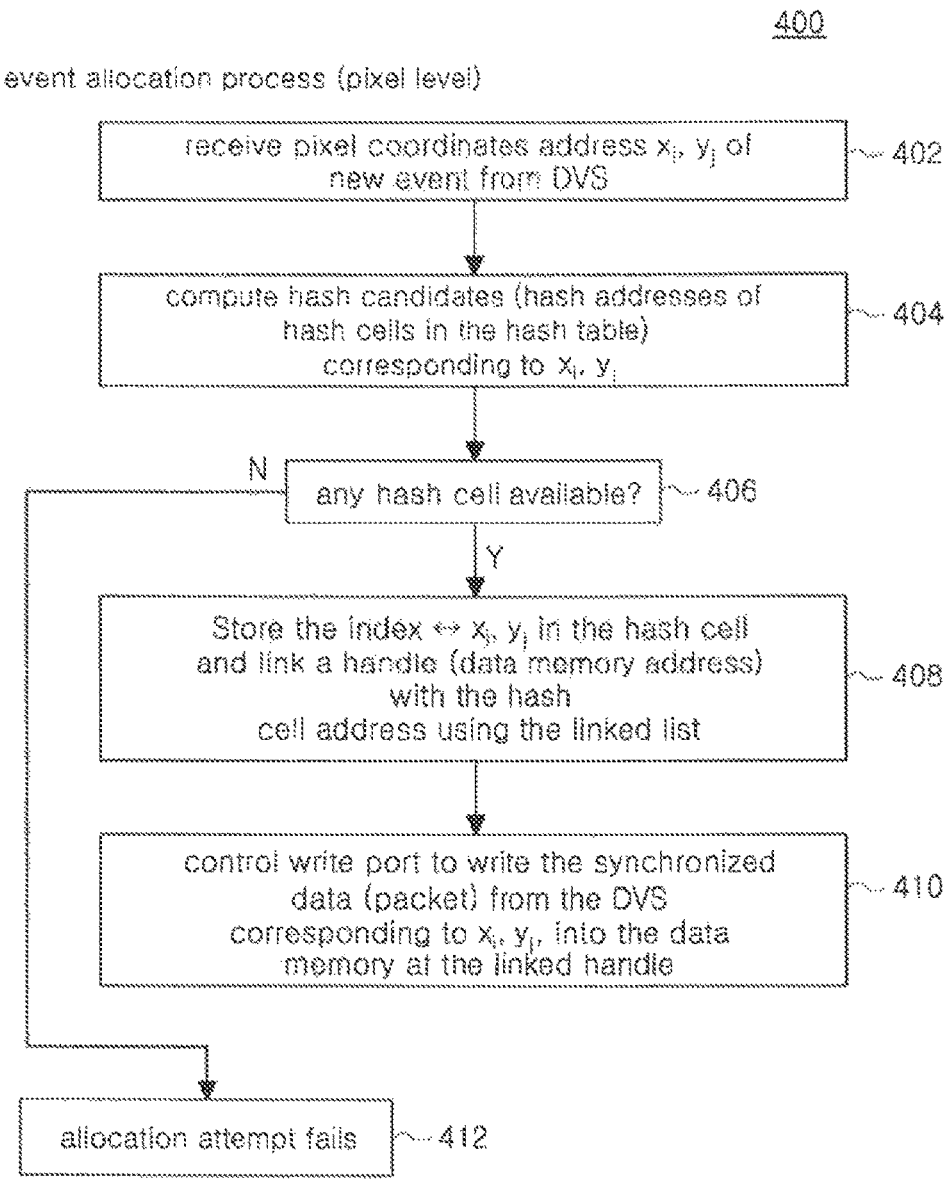
FIG. 4A is a flow chart of an example method for pixel data allocation in the VFB performed on a single pixel level basis.

Referring to FIG. 4A, a flow chart of an example method, 400, for pixel data allocation on a single pixel level is shown, the method being performed by control unit 200. In method 400, a pixel coordinates address $x_i$, $y_j$ of a new event originating from DVS 110 is received 402, along with pixel data and a time stamp for the event in a data packet such as that shown earlier in FIG. 2. To this end, any of the writing schemes discussed above may be used. For instance, the writing of event_data may involve routing the DVS output data through an external processor like CPS system 115, which sets a write mode and supplies the address data and packet data on address line 104 and bus line 102w, respectively.

Control unit 200 computes 404 hash candidates corresponding to the index for $x_i$, $y_j$ (see discussion of indexes referencing FIG. 7C earlier) by means of a hash candidate generator using a hash function. (As discussed later with respect to FIG. 8, control unit 200 may also include a patch indexes calculator to calculate an index corresponding to the input coordinates $x_i$, $y_j$.) Each hash candidate corresponds to a hash of a cell (also called "hash cell") in the hash table 130. For instance, each hash candidate may be an integer value equaling an integer address value of a hash cell (in the range of 1 to AK). At 406, it is determined whether any hash of the hash candidates is available. A hash cell is available if it is not currently storing a previous pixel index linked with data currently stored in data memory 150. For example, as noted above there may be approximately twice as many cells (AK cells, A~2) in hash table 130 as there are in data memory 150. Therefore, even when data memory 150 is full, hash table memory 130 may be only approximately half full, so that empty cells are available for new allocations. Each time pixel data is read out of data memory 150 to an external system mainly on a FIFO basis, the linked hash cell in hash table 130 is emptied. Data memory 150 cells may also be overwritten, and previous/next handles changed, if the current event is for a pixel address at which pixel data is already currently stored.

In the unlikely event that no hash cells corresponding to the hash candidates are available at 406, the allocation attempt fails at 412. If a hash cell is available at 406, then at 408 the index associated with $x_i$, $y_j$ is stored in the hash cell and the method links (i.e., associates) a handle with the hash, where a handle is both a linked list 140 address and a data memory 150 address as illustrated in FIG. 3B discussed earlier. The linked handle, and the hash value, may each be stored in association with each other in the hash table memory 150 and linked list memory 140, respectively. With the "index to handle" link, hereafter denoted "I2H" link, thus established, at 410 control unit 200 may control the write port 160 to write the synchronized pixel data from the DVS corresponding to xi, yj, into the data memory 150 at the handle address. Accordingly, the overall method may use a pseudo random allocation of indexes to hashes, establish linked handles through a linked list, and store event data based on the handles.

Figure 4B:
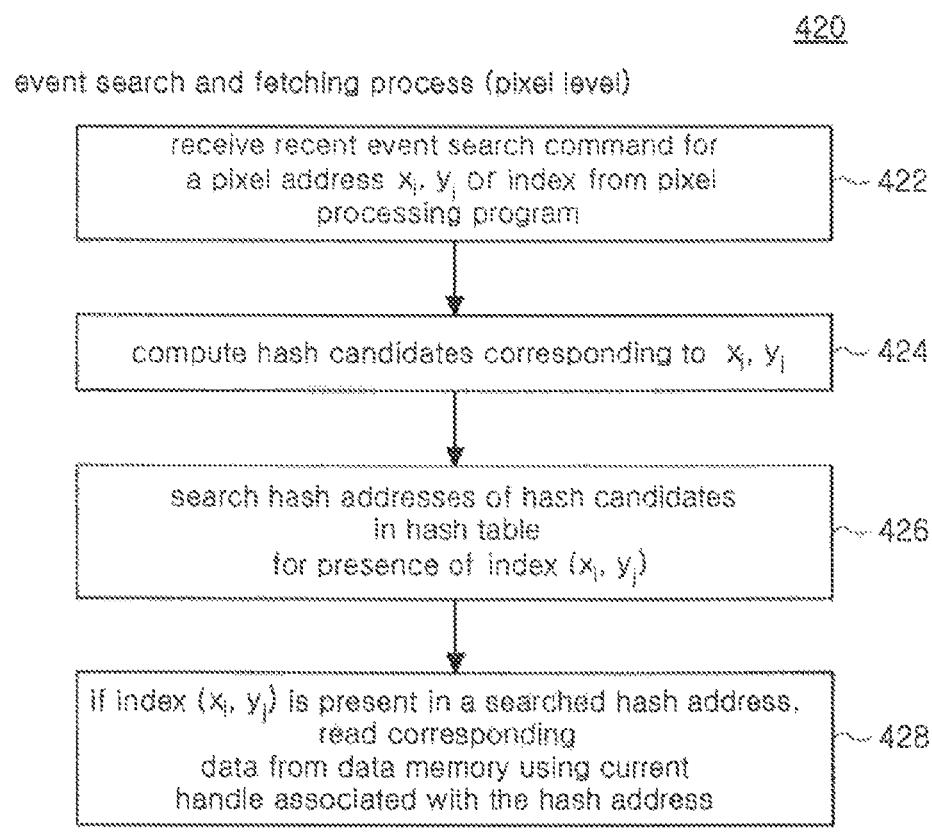
FIG. 4B is a flow chart illustrating an example event searching and fetching method performed at the pixel level.

FIG. 4B is a flow chart illustrating an example event searching and fetching method, 420, at the pixel level, performed by control unit 200. As discussed earlier, a pixel processing algorithm may include an operation of dynamically searching a frame buffer for the latest pixel data at selected pixel locations; and this may be achieved by searching the small memory of VFB 100 for recent events. To this end, control unit 200 may receive 422 a recent event search command for a pixel address $x_i$, $y_j$ or corresponding index, hereafter denoted "index ($x_i$, $y_i$)" from a pixel processing program (e.g., running in CPS system 15 of FIG. 2). The recent event search may be implemented by CPS system 115 just setting the r/w bit to the read mode value, and supplying the requested address. In response, hash candidates corresponding to $x_i$, $y_j$ may be computed 424 using the same hash function as in the allocation method. Hash cells corresponding to the hash candidates may then be searched 426 in hash table memory 130 for the presence of the index ($x_i$, $y_j$). If the index is present in a searched hash cell, data corresponding thereto is read 428 from data memory 150 using the current handle associated with the hash. (The data may have been written in data memory 150 in the same packet format as output by the DVS.)

If pixel data is also sought from a local environment of the pixel at $x_i$, $y_j$, the process may be repeated for a pixel at ($x_{i+1}$, $y_j$,), ($x_i$, $y_{j+1}$,), etc. For instance, if pixel data is sought for a local pixel group in a size of 5×5 pixels, the process may be performed 25 times. (Sequentially repeating the fetching process 25 times is inefficient for many applications, therefore a patch-level based fetching method discussed below may be applied.) The allocation and fetching methods provide the same hash candidates using the same hash function. Since it is desirable that the probability of a successful allocation be very high, to minimize any data loss in the pixel level based allocation and fetching just described, a relatively high number of hash candidates may be used for single pixel allocation/fetching (e.g., about 10 hash candidates).

Figure 4C:
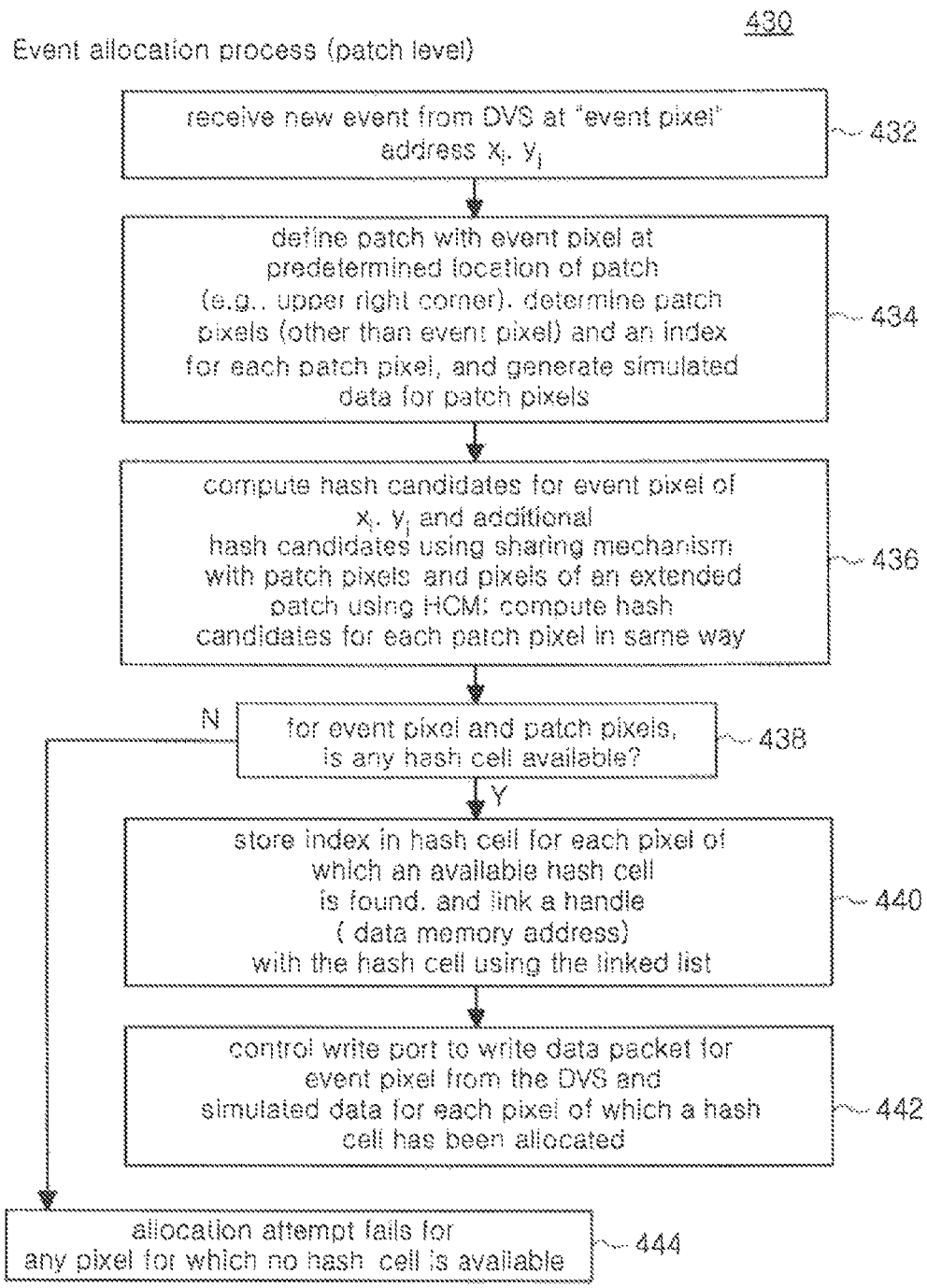
FIG. 4C is a flow chart of an example method for event allocation at a patch level.

Alternatively, an allocation and fetching scheme may use a patch-level based mechanism that implements a hash function with a relatively small number (e.g., about two hash candidates). FIG. 4C is a flow chart illustrating an example method 430 of event allocation at the patch level. Method 430 may be performed using the arrangement of FIG. 1B or FIG. 2 with processor 112 or CPS system 115 receiving a data event from DVS 110 and generating simulated event data for an entire patch of pixels. Thus, processor 112 may receive 432 a new event for the "event pixel" of address $x_i$, $y_j$. At operation 434, processor 112 may then define a patch with the event pixel at a predetermined reference cell position of the patch e.g., upper right corner of patch, a central position of patch, etc. The patch may have a size up to $W_P \times H_P$ and its spatial position is defined by the event pixel address $x_i$, $y_j$. Processor 112 thus determines the patch pixels (other than the event pixel) defined around the event pixel at $x_i$, $y_j$.

Processor 112 may also generate simulated pixel data for the patch pixels. In some embodiments, the simulated pixel data is the same as the pixel data for the event pixel. In other embodiments, the simulated pixel data differs from the pixel data and is generated based on an algorithm being executed by processor 112. For instance, the simulated pixel data may be pixel data interpolated based on pixel data already collected at other pixel locations outside the patch. With patch-based allocation, an attempt is made to write all the pixel data for the entire patch contemporaneously. All the pixel data for a patch may be written, or attempted to be written, before pixel data of the next data event from DVS 110 is written.

Control unit 200 may execute a corresponding program that knows beforehand how a patch is to be defined when patch-based processing is to be performed. Control unit 200 may define indexes for the pixels (one index for the event pixel and different indexes respectively for the patch pixels) based on the event pixel address xi, yi received from processor 112. (The indexes may be defined by a patch indexes calculator 802 of FIG. 8 discussed later.)

At operation 436, first hash candidates corresponding to the index of the event pixel are computed. Second hash candidates, each corresponding to a respective index a patch pixel, are also computed. The first and second hash candidates may be computed by a hash candidate generator within VFB 100, e.g., using a hash function that provides a small number of candidates. The first hash candidates may include "intrinsic" hash candidates and additional, "extrinsic" hash candidates that are computed using a sharing mechanism with a hash candidate mask (HCM) discussed below in reference to FIGS. 7A-7C. Likewise, second hash candidates of each patch pixel may include intrinsic hash candidates and additional, shared hash candidates computed using the HCM. The sharing mechanism may be, e.g. based on $W_{EXTP} \times H_{EXTP} \times N$, where $W_{EXTP}$ denotes an extended patch width, $H_{EXTP}$ denotes an extended patch height, and N is an integer of one or more. In this scheme, additional hash candidates are computed based on indexes of other cells of the original patch ($W_P \times H_P$) and/or neighboring cells of the original patch. As an example, in the pixel level based allocation scheme mentioned above, if a patch is 5×5 and 6 hash candidates are generated for each pixel of the patch, 150 hash candidates would be collectively generated, which may require a larger hash table memory than desired. In a sharing scheme of a patch-level based mechanism, a hash function may provide two hash candidates for each pixel, but the sharing mechanism may generate an additional four hash candidates per pixel from their adjacent pixels. As a result, the probability of allocation may still be acceptably high, yet hash table memory requirements are significantly reduced. The hash candidate sharing mechanism will be described further below in reference to FIGS. 7A-7C.

At operation 438, control unit 200 determines whether any hash cell corresponding to the first hash candidates is available for the event pixel. Likewise, control unit determines whether any hash cell of the second hash candidates is available for each of the patch pixels. If no hash cell is available for a given pixel within the patch, the allocation attempt fails for that pixel at 444. If a hash cell is available for a given pixel, at 440 the index for that pixel is stored in the hash cell and a handle is established and written in the hash cell (as in FIG. 3B) using the linked list scheme. Concurrently, the write port is controlled 442 to write the pixel data corresponding to the index (e.g., in the same packet format output by the DVS) corresponding to xi, yj, into the data memory 150 at the handle.

It is also noted that in the patch-based allocation method 430, for each pixel in the patch, the method determines whether any of the hash candidates is available (just like the pixel-level based allocation); however, since some of the hash cell candidates are shared, there should be a prioritization policy for allocation on each shared hash cell candidate. Control unit 200 may implement the hash cell allocation based upon such a prioritization policy.

Figure 4D:
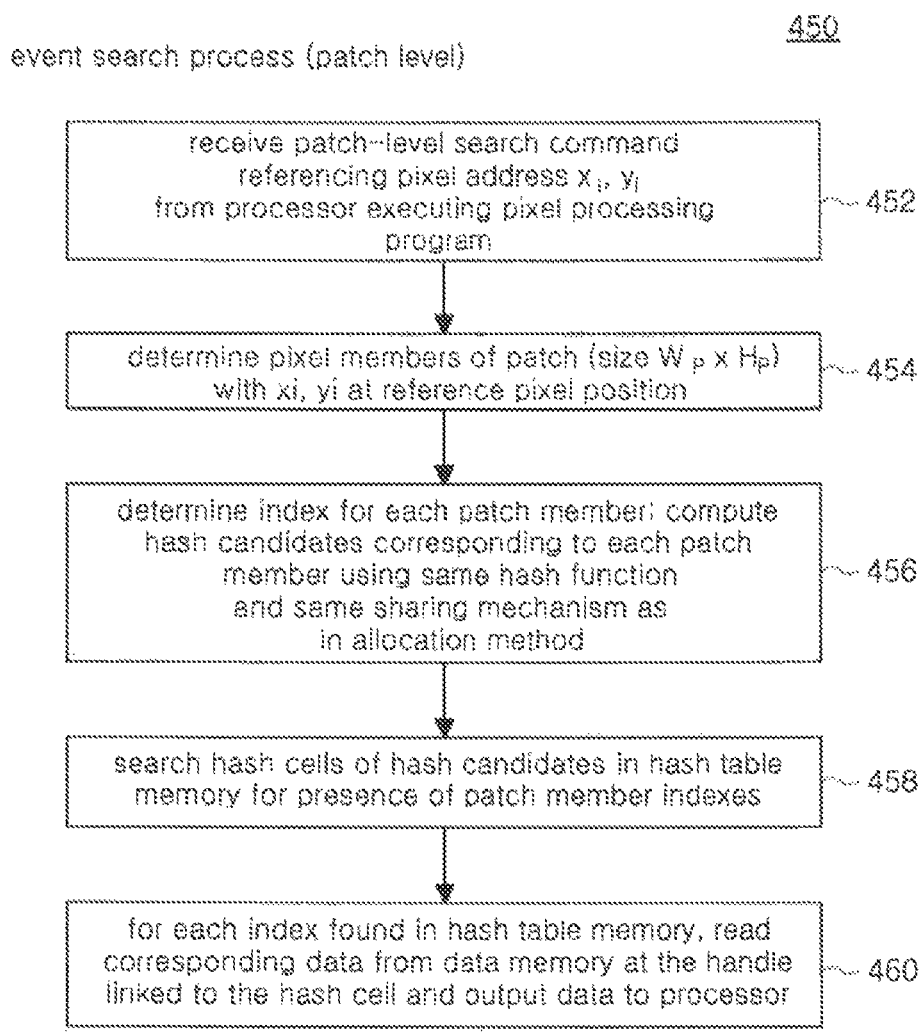
FIG. 4D is a flow chart of an example patch-level based event searching and fetching method.

FIG. 4D is a flow chart of an example patch-level based event search method 450. Method 450 employs the same hash candidates generation and sharing mechanism as was used in the patch-level allocation method 430. A patch-level data search command may be received 452 by control unit 200 that references a pixel address $x_i$, $y_j$. The command may be received from a processor executing a pixel processing program, e.g. in CPS system 115, by initiating a read mode and providing the requested pixel address on address line 104. Members of a patch of size $W_P \times H_P$, with pixel address $x_i$, $y_j$ at a predetermined location (upper right corner, center, etc.) may then be determined 454 by control unit 200. Next, at 456, control unit 200 may determine an index for each patch member and compute the same hash candidates corresponding to each patch member (using the same hash function and sharing mechanism) as were computed in the allocation method 430. Hash cells of the hash candidates may then be searched 458 in the hash table memory 130 for the presence of the patch member indexes. For each index found in the hash table memory, corresponding data may be read 460 from data memory 150 using the current handle associated with that hash cell, and the read data is output to the processor or other external device.

Figure 5:
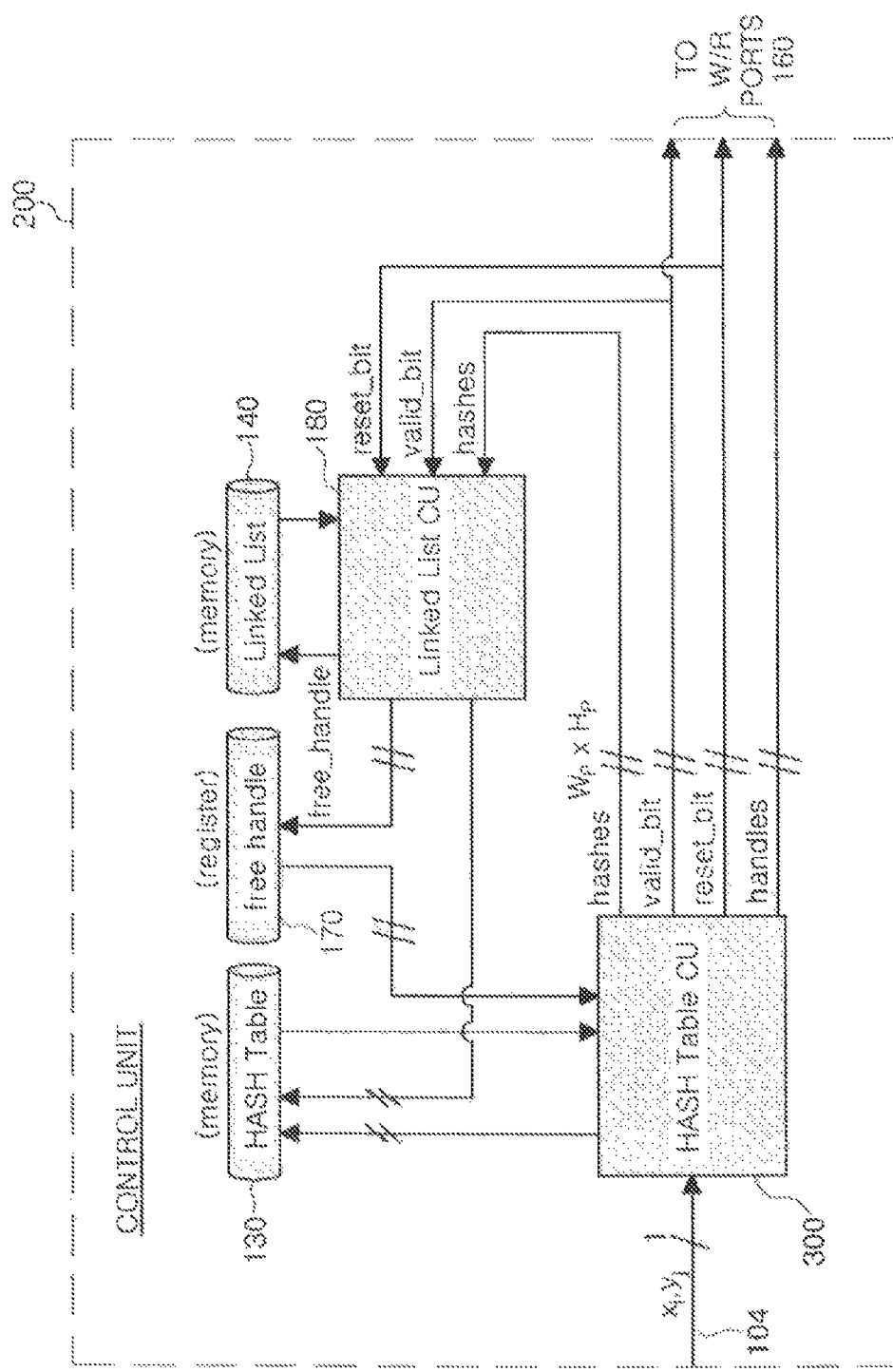
FIG. 5 is a block diagram of an example control unit that may be used in the VFB.

FIG. 5 is functional block diagram of an example control unit 200 that may be used in VFB 100. Control unit (CU) 200 may include two sub-control units, i.e., a hash table CU (HTCU) 300 and a linked list CU (LLCU) 180. A hash table memory 130 and linked list memory 140 may be considered part of CU 200 as in FIG. 5 or as memories external of CU 200 as in the configuration of FIG. 3. CU 200 may also include a free handle register 170.

Hash table CU 300 may control various allocation and fetching operations described above in the methods 400, 420, 430 and 450 of FIGS. 4A-4D. In particular, HTCU 300 may allocate or fetch requested events for patch members corresponding to x,y coordinates. For allocation, data events received from processor 112 (e.g. within CPS system 115) are written to data memory 150. For fetching, data events are read from data memory 150 when a read mode is set by an external processing system (e.g. system 115). To this end, HTCU 300 may output the above-described handles, which may be common addresses for the linked list and data memories 140 and 150. The allocation process may find and occupy a free address, i.e., a hash, in hash table memory 130. As described above with respect to FIG. 3B, each cell of hash table memory 130 may store the handle and the index that are currently linked to one another. A link from coordinates to index to handle may be referred to as a coordinates/index to handle ("I2H") link. The I2H link, once set, is unique, so that specific coordinates/index (for any given event) are linked only to a specific handle and vice versa. Once the event is read out of data memory 150, the I2H link is erased, and a new I2H link may be defined when an event from the same coordinates is received in the future. This is because the handles are typically assigned chronologically as new events arrive (as will be seen in the example of FIG. 10 later).

In case of a new allocation, HTCU 300 may use the free handle register 170, which indicates which addresses in data memory 150 are currently marked as free. Thus, a free cell in memory 150 may be linked to the new registered index (stored in a hash of hash table 130), using a handle output by HTCU 300. The handle may be output along with an ON 'reset_bit' which indicates that this handle is currently pointing on uninitialized data—"garbage", and the data memory 150 cell needs to be initialized before the first use. (The ON reset_bit is for writing data to memory 150.) The latter concept may involve a "content switch" between cells in data memory 150, in which a specific data cell that once was linked to some index can later be linked to a different index. (An example of such content switch is given in FIG. 10 discussed later.)

In case of fetching an already existing allocation, HTCU 300 may output the stored handle with an OFF reset_bit, which enables a read operation from data memory 150. In addition to the handle, the hash and the reset_bit, HTCU 300 may also output a 'valid_bit' that indicates whether the allocation or the fetching procedure was successful. It should be noted that in the case where the VFB is in "read" mode, an allocation procedure may be delayed or skipped. In this case, the valid_bit may only indicate a successful fetching, and the reset_bit may always be 'OFF'.

LLCU 180 may supply 'free_handles' to free handle register 170 indicating which data memory 150 cells are free, keep the hash table memory 130 clean, and prioritize which I2H links will be deleted and which will be long living. As seen above in FIG. 3B, each cell in the linked list memory 140 may contain control pointers (Prev_handle and Next_handle) and a hash value of hash table memory 130). Data associated with an I2H link may be: i) the index stored in a cell of hash table memory 130 at a hash value address; ii) the linked handle stored in hash table memory 130; iii) the handle/control pointers and the hash value stored in linked list memory 140, and iv) the corresponding pixel value data stored in data memory 150. Thus, when the I2H link is said to be deleted, all of these data are deleted. Also, since the linked list mechanism may apply a dynamic reordering of static handles (only by changing the control pointers), then it is possible to promote some handles so that their I2H links are more active and popular than others. A handle associated with an I2H link that is the least popular (e.g. the oldest) may be output to free handle register 170 as the next free_handle for HTCU 300 to use.

As mentioned earlier, since the number of cells in data memory 150 (equaling the number of handles) may be K, the number of cells is AK in hash table memory 130, and since hash table memory 130 contains unique I2H links, then it can be understood that there are always at least (A−1)K empty cells in it. This fact directly influences the probability for success in the allocation procedure (discussed further below).

Figures 6, 7A:
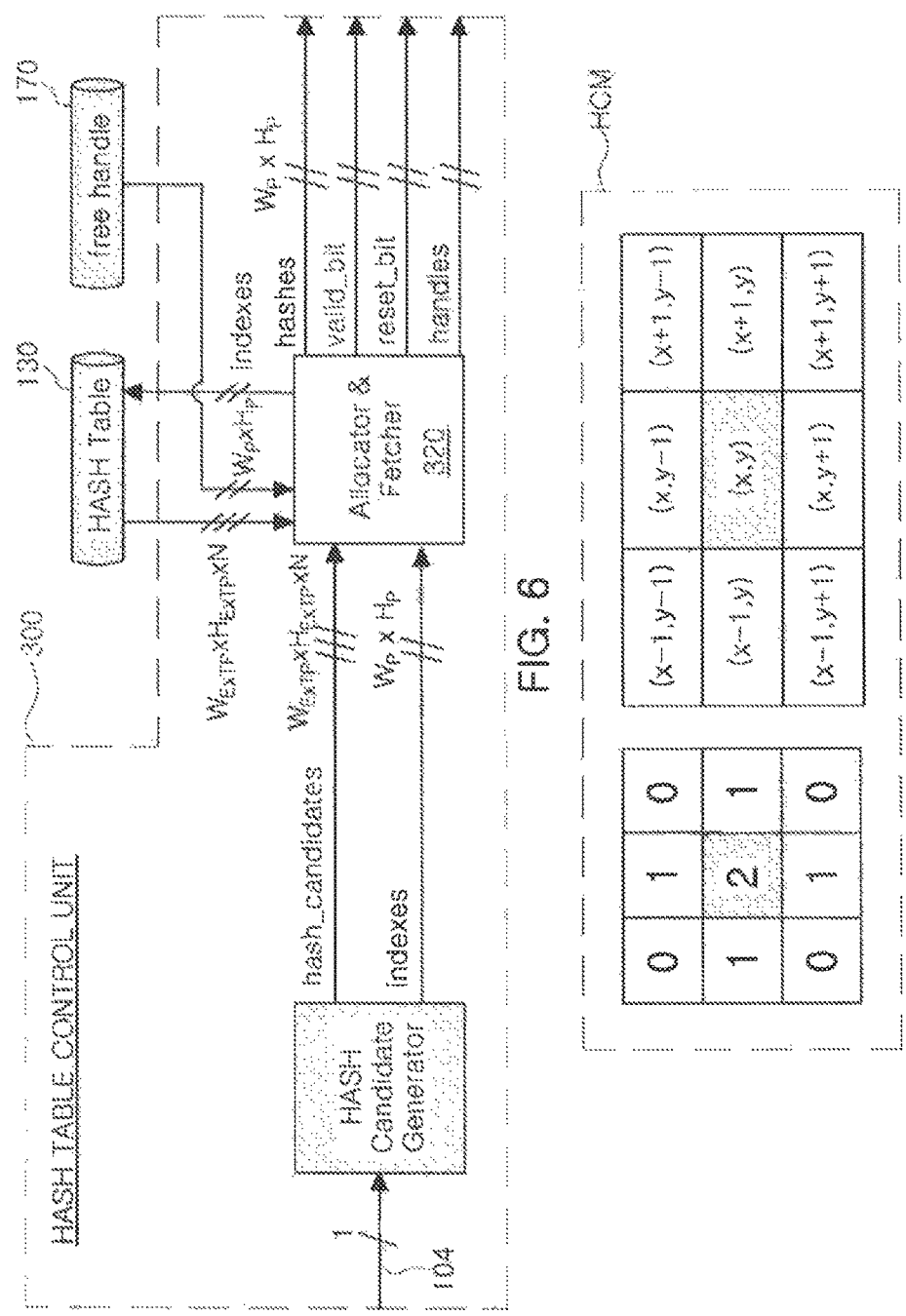
FIG. 6 is a functional block diagram of an example hash table control unit that may be used in the VFB.
FIG. 7A is an example hash candidate mask (HCM) that may be stored by a hash table control unit.

FIG. 6 is a functional block diagram of an example HTCU 300. HTCU 300 may include a hash candidate generator 310 and an Allocator and Fetcher 320. As described above, a purpose of HTCU 300 may be to allocate or fetch requested patch members by forming I2H links and then output their handles. In the case of patch-based allocation (described with reference to FIG. 4C earlier), hash candidate generator 310 may compute indexes of all patch pixels from just a single input pixel address $x_i$, $y_j$. Both the allocation and fetching relies on hash candidates, which may be pseudo random conversions of specific coordinates/index to multiple hashes. The number of hash candidates computed for a particular pixel's coordinates/index may be significantly less than the number of hash cells in the hash table memory 130. Every hash is an address in the hash table memory 130 (as explained before) and it is assumed that the virtual memory size (related to the input coordinates/index) is much larger than the actual memory size. Hash candidates may be computed on an individual pixel level basis, with or without the use of hash candidate sharing. (Hash candidate sharing with an HCM is also possible for the single pixel allocation/fetching, which is understood by assuming a patch size $W_P \times H_P = 1$, explained further below.) Hash candidates in the case of patch-based processing may be derived with or without the use of a sharing mechanism of hash candidates among neighboring pixels. The sharing mechanism will now be explained in reference to FIGS. 7A to 7C.

Figure 7B:
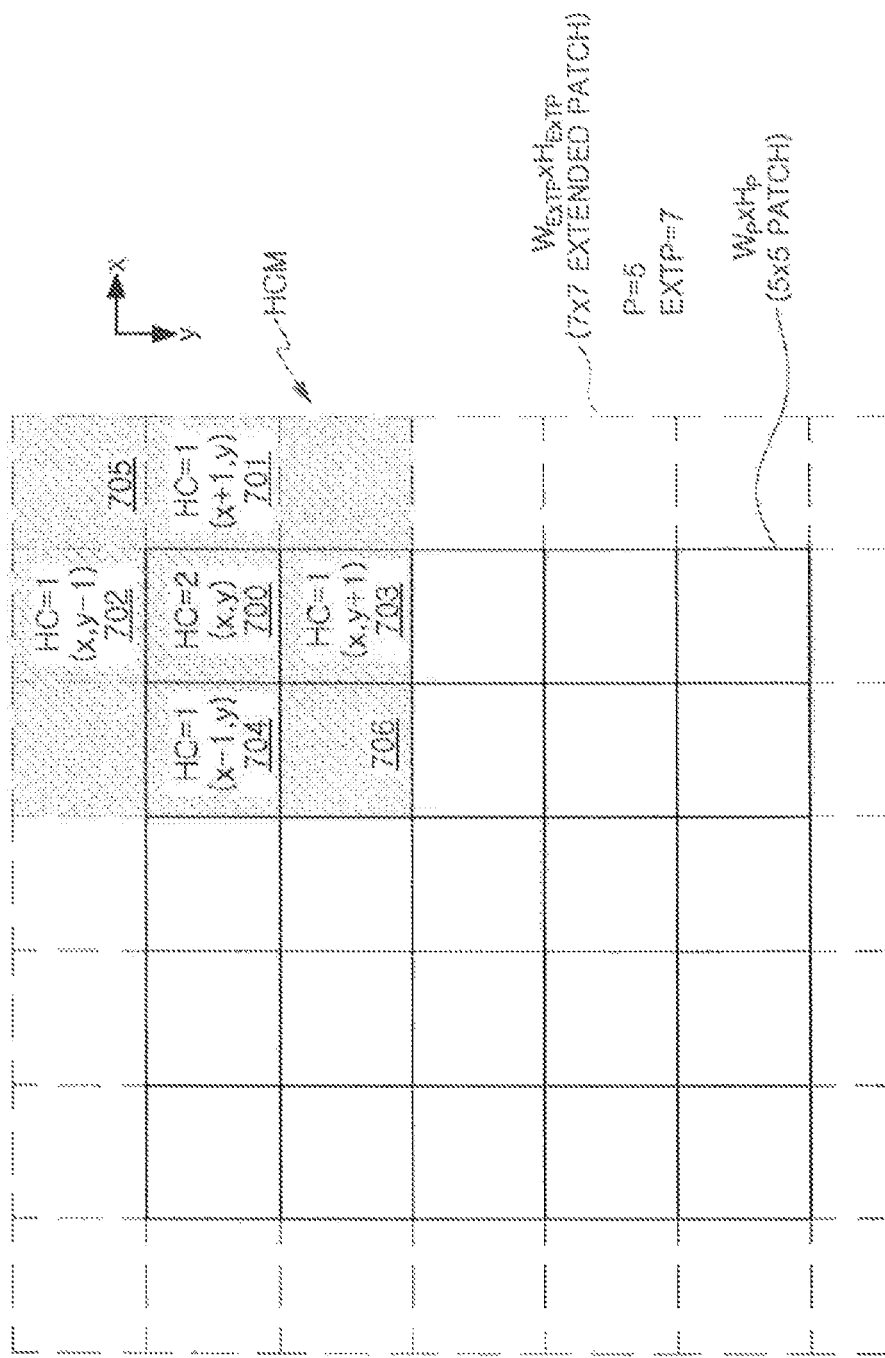
FIG. 7B illustrates how the HCM of FIG. 7A may be applied to an example patch of 5×5 pixels.
Figure 7C:
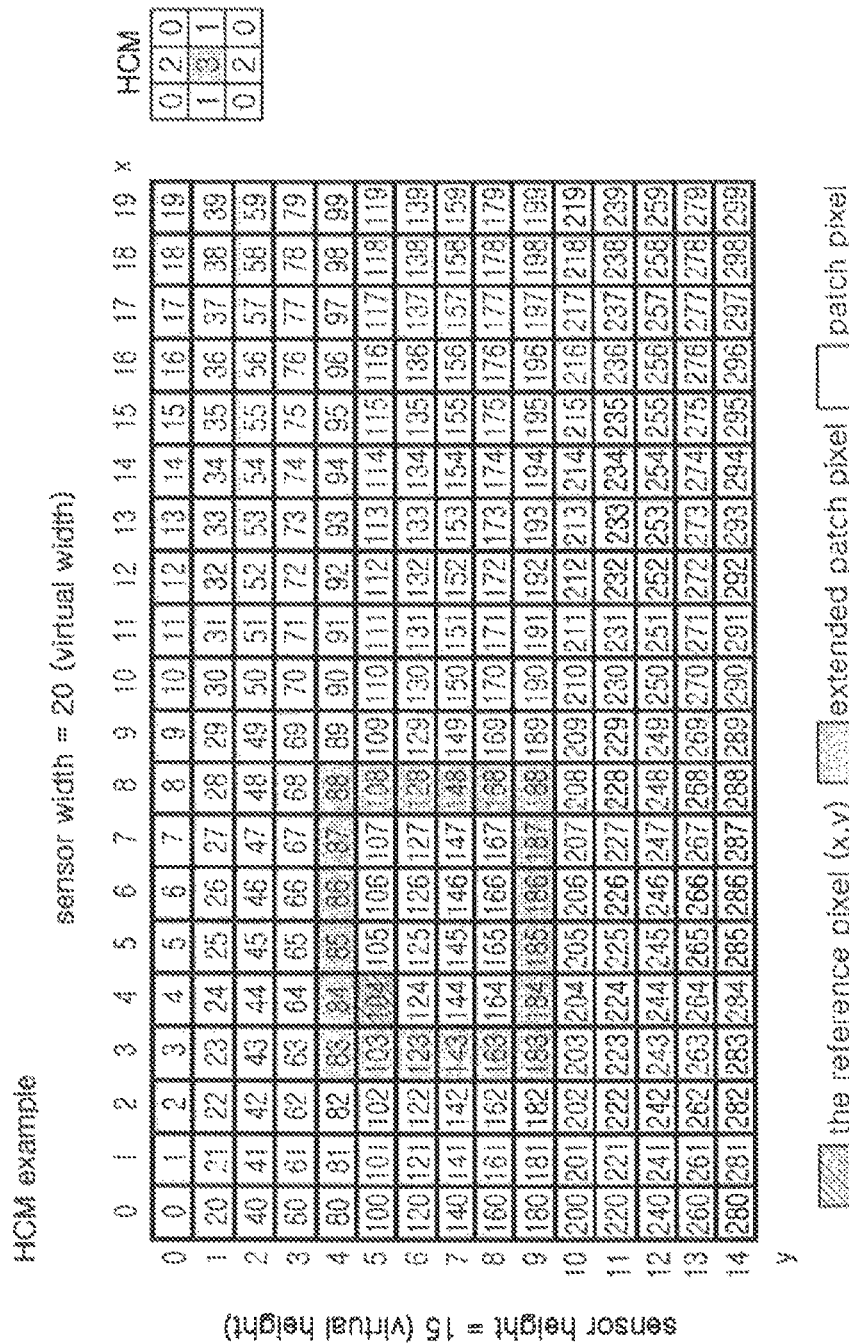
FIG. 7C illustrates another example of an HCM applied to a patch of pixels.

FIG. 7A illustrates an example Hash Candidate Mask (HCM) that may be stored by HTCU 300. FIG. 7B illustrates how the HCM may be applied to an example patch of 5×5 pixels. FIG. 7C illustrates a further example with a patch size of 4×4, where an extended patch is shown in relation to cells of a sensor grid. Hash candidates in the case of patch-based processing may be considered to coincide to a cube in size $W_{ExtP} \times H_{ExtP} \times N$. The dimensions of this cube are directly derived by a selected HCM. The HCM is a 2D filter like matrix in size $W_{HCM} \times H_{HCM}$. The examples of FIGS. 7A-7C show a 3×3 matrix, where HCM mask values are shown on the left and the corresponding neighbor coordinates/indexes on the right. The practical meaning of this matrix is as follows:

1. The central number of the HCM is the number of "intrinsic" hash candidates generated for each pixel (defined by x, y pixel coordinates). This number is the third dimension of the hash candidates cube ('N') and it is preferably the largest number in the HCM. In the shown example, N=2.

2. The other numbers in the HCM except the central one define a sharing constellation of candidates between the central pixel and its neighboring pixels. Each number defines how many candidates from the intrinsic candidates of the neighbor will be shared with the central pixel and used as "extrinsic" hash candidates. For example, in FIG. 7A, the upper center value is 1, so the first candidate from the 2 intrinsic candidates of the upper center neighbor will be shared with the central pixel and used as an extrinsic candidate. In the same way, there are no candidates sharing between the central pixel and the four corners of the HCM since their values are 0.

3. The sum of HCM is the total number of candidates which are available to the central pixel.

As a result of this structure of sharing candidates, the first two dimensions of the hash candidates are larger or equal to the size of the actual requested patch according to: $W/H_{ExtP} = W/H_P + W/H_{HCM} - 1$. This result is similar to post 2D convolution dimensions. Thus, an HCM is similar to a 2D convolution filter—it works on all the pixels in the patch—so in each allocation sub-process, other pixels from the patch are represented by the center of the HCM. This may be better understood with reference to FIGS. 7B and 7C:

FIG. 7B illustrates an example application of an HCM to a patch of pixels. Consider a 5×5 patch of pixels ($W_P \times H_P = 5 \times 5$). It is desired to obtain hash candidates for a pixel 700 under consideration, with coordinates x, y, which is a pixel disposed in an outer section of the patch. It is assumed that the HCM of FIG. 7A is applied to pixel 700. HTCU 300 uses a hash function to compute two hash candidates corresponding to coordinates x, y. It may also use the same hash function to compute two hash candidates for each of neighboring pixels 701, 702, 703 and 704. However, it only allows for one hash candidate associated with each pixel 701, 702, 703 and 704 to be shared with pixel 700, according to the values of "1" assigned to the central right, left, top and bottom positions of the 3×3 HCM as seen in FIG. 7A. Thus, a total of six hash candidates are made available to pixel 700. On the other hand, no hash candidate is available for sharing from pixel 705, since the right corner of the 3×3 HCM mask was assigned a value of 0. An extended patch $W_{EXTP} \times H_{EXTP}$ of a patch size 7×7 may thereby be considered to be applied to the hash candidate generation for the main patch $W_P \times H_P$. Therefore, in the event allocation process, if an event occurs for pixel 700, six hash candidates are made available in this fashion, which gives a high probability of allocating the input x,y coordinates to a hash of hash table memory 130. The same six hash candidates may also be generated during the fetching process to facilitate a search for a stored event coinciding with pixel 700.

FIG. 7C illustrates another example of an HCM applied to a patch of pixels. This case assumes a DVS 110 sensor with 300 cells arranged in a grid, having a width W of 20 cells and a sensor height H of 15 cells. Pixel coordinates range from 0,0 for the first cell in the upper left corner of the grid to 19, 14 for the 300$^{th}$ cell at the bottom right corner. The first cell at coordinates 0,0 is mapped to an index (value) of "0" and the last cell, at coordinates 19, 14 is mapped to an index of 299. Note that the index for any pixel in this sensor geometry can be calculated by: index=x+20*y.

As shown in FIG. 7C, the reference pixel has coordinates of (x=4, y=5) and therefore the index is 104. The reference pixel can be the above-noted "event pixel" in the case of allocation, or, a pixel having an address (coordinates) referenced in a recent event search command, in the case of fetching. In the example, the patch size is 4×4 and the reference pixel is the upper left corner of the patch, so that the patch pixels (including the reference pixel), i.e., the patch members, are identified by indexes 104-107, 124-127, 144-147 and 164-167. The HCM is in size 3×3 and therefore the extended patch is in size 6×6.

Since the center in the HCM is 3 (N=3), then for all pixels in the extended patch there will be 3 hash candidates generated.

According to this HCM, each patch pixel will have 9 candidates in total: 3 self-candidates ("intrinsic" hash candidates); the first 2 of the 3 candidates (2|3) of the pixel above; the first 2 of the 3 candidates (2|3) of the pixel below; the first 1 of the 3 candidates (1|3) of the left pixel; and the first 1 of the 3 candidates (1|3) of the right pixel. For example, the pixel with index 166 will have: its 3 self-candidates; (2|3) of index 146 (shared candidate); (2|3) of index 186 (shared candidate); (1|3) of index 165 (shared candidate); and (1|3) of index 167 (shared candidate). Note that according to this HCM the last candidate (i.e. the 3$^{rd}$ candidate) of any given pixel will never be shared. The 3$^{rd}$ candidate may therefore be called a "private candidate" and used only by the pixel that "owns" this candidate (the pixel of which the 3$^{rd}$ candidate is based on).

It is noted here that the various "units" and other blocks or elements described herein with control, data communication and/or processing functionality, such as control unit 200, linked list control unit 180, hash control unit 300, hash candidate generator 310, and allocator and fetcher 320, are comprised of hardware circuitry and may therefore may each be alternatively referred to as a "circuit", "circuitry", "computational hardware" or the like. For example, any of the control units may be interchangeably referred to as control circuitry, etc.

Returning to FIG. 6, a purpose of the Allocator & Fetcher (A&F) circuit 320 is, during allocation for an event, to determine which hashes in hash table memory 130, corresponding to hash candidates received from hash candidate generator 310, are empty. If a hash is occupied, it contains an I2H link (the stored index and linked handle as seen in FIG. 3B). Thus, A&F circuit 320 may first read all the I2H links from hash table memory 130, and thereafter allocate an incoming event to an empty hash cell. Here, A&F circuit 320 may create a new I2H link by storing the index of the event along with a currently free handle (a "new handle" taken from the 'free_handle' register 170) in the hash cell, and sets its corresponding 'valid_bit' to TRUE. The purpose of the 'valid_bit' is to notify the LLCU 180 to link this new handle to the linked list (set the control pointers properly and store its corresponding hash) and set a new free handle to the 'free_handle' register 170. However, if the allocation attempts have failed for a specific index then the A&F circuit 320 treats it as a 'miss' and sets its corresponding 'valid_bit' to FALSE.

During a fetching request to search for data at a requested index, hash candidates are likewise received by A&F circuit 320 and the hashes corresponding thereto in hash table 320 are searched to determine whether any of these has the index value stored therein. If the fetching attempts have failed for a specific index then the A&F similarly treats it as a 'miss' and sets its corresponding 'valid_bit' to FALSE.

As discussed above, by design the size of data memory 150 is K and the size of the HASH Table Memory is AK, where A>1, and due to the uniqueness and the exclusiveness of the I2H link, it guarantees that the sparsity ratio of hash table memory 130 (between the occupied cells to the total number of cells in the memory) will be at the most 1/A. This sparsity ratio directly defines the probability of successful allocation. For example, if, in simple case, an allocation attempt is made for a single index only ($W_P=1, H_P=1$), and only one candidate is randomized, then the probability that the candidate will be occupied is approximately 1/A. In the same way, if we are randomizing two candidates, then the probability that both candidates will be occupied is approximately 1/A$^2$ and so on. It can be concluded that the probability of successfully allocating a single index with 'M' candidates is approximately:

$$P_{allocation} \cong 1 - \frac{1}{A^M}$$

The above approximation is valid also for an allocation of multiple indexes (as when allocating an entire patch) but with a 1×1 HCM, i.e., no candidate sharing between neighbors. However, in the case of other HCMs, due to the candidate sharing, a more complex probability calculation can be made.

It should be noted that the techniques of candidate selection, prioritization and conflict handling may be done in a conventional manner known in the art, and thus a detailed explanation thereof is omitted herein for brevity.

Figure 8:
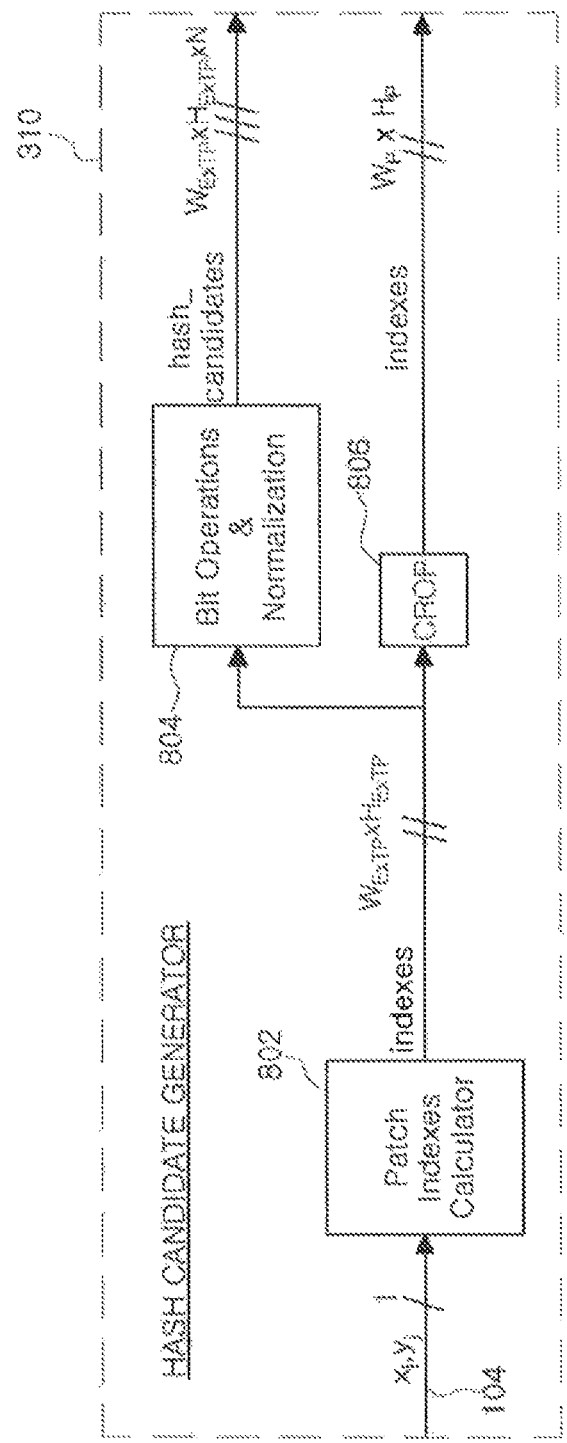
FIG. 8 is a block diagram of a hash candidate generator that may be used in the hash table control unit of FIG. 6.

Referring now to FIG. 8, a block diagram of an example hash candidate generator is illustrated. Hash candidate generator 310 includes a patch indexes calculator 802 that calculates all the extended patch indexes. This may be done by taking the coordinates $x_i$, $y_j$ of one position of the patch (e.g., a corner pixel), received on address line 104, and calculating the coordinates of all the other extended patch members. For instance, in the case of a single pixel coordinates input x, y, and the case of a 5×5 patch and a 7×7 extended patch, the patch indexes calculator 802 may simply output the coordinates of the 7×7 extended patch (49 values), and these are provided to each of a Bit Operations and Normalization (Bit O&N) block (circuit) 804 and a Crop block (circuit) 806. Bit O&N block 804 may take each index separately and compute N hash candidates for each index, and determine hash candidates for sharing using the HCM sharing mechanism described above. For instance, if using the HCM of FIGS. 7A and 7B, 6 hash candidates may be computed for each index of a patch pixel. Crop circuit 806 may output either the single index for an event pixel (which is ultimately stored in the hash cell) in the case of single pixel processing, or, a sequence of indexes corresponding to the pixels of the non-extended patch ($W_P \times H_P$) in the case of patch-based processing. In the latter case, the non-extended patch is a patch among the virtual full frame dimensions, and the indexes may be converted to sequential indexes (e.g., using a MATLAB sub2ind Function®).

Figure 9:
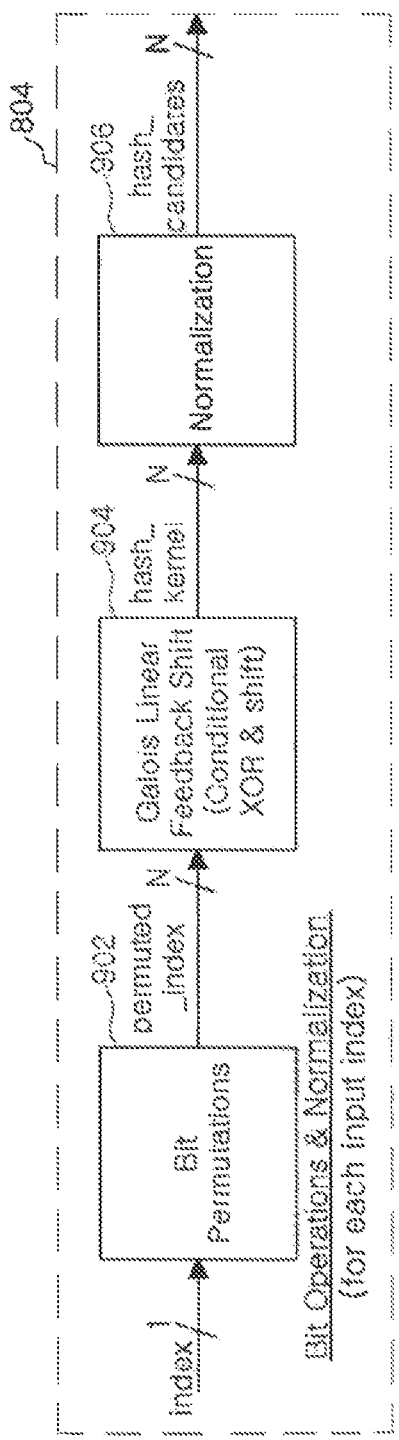
FIG. 9 is a block diagram of an exemplary Bit Operations and Normalization circuit.

FIG. 9 is a block diagram of an exemplary Bit O&N block 804. Block 804 may include a bit permutations block (circuit) 902, a Galois linear feedback shift register (LFSR) 904, and a normalization block (circuit) 906. Suppose for example that the input index is a 32-bit unsigned integer, and the output 'hash' candidate is an unsigned integer in the range of $[0, h_{max})$. The Bit Permutations block 902 contains N static permutations that reorders the bits of the input index and creates N different permuted indexes. Then, on each permuted index, a Galois Linear Feedback Shift operation may be performed by LFSR 904. In this process, if the LSB of the permuted index is 0 then the permuted index remains unchanged, otherwise it generates a bit XOR between the permuted index and a toggle mask (constant number). This toggle mask may be derived from the taps of a primitive binary polynomial (irreducible polynomial) of degree 32. Afterwards, the result is right-shifted once.

A 32-bit maximum-length Galois LFSR may be used for generating pseudo random numbers, as this design has been found to provide a HW friendly configuration. The output from this stage is N 32-bit 'hash' kernels that practically represent numbers in the interval of [0,1) with 32 fraction bits. Normalization block 906 may be a simple multiplier-shifter that multiplies the 32-bit 'hash' kernels with $h_{max}$ and right-shifts the result 32 times. It is noted here that while the Galois LFSR approach has been described herein as an example, various other hash candidate generating schemes may be utilized in the alternative.

Figure 10:
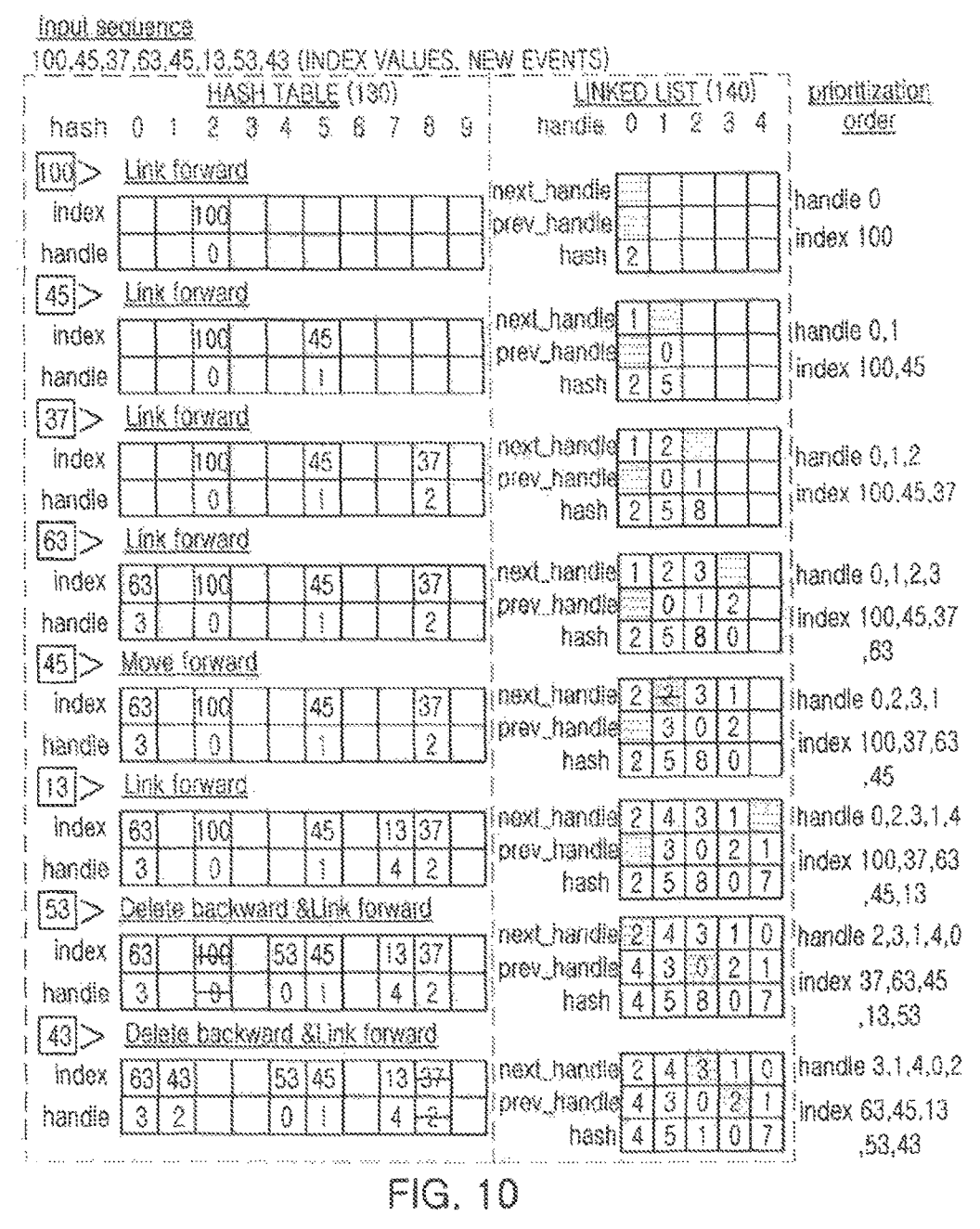

FIG. 10 illustrates examples of hash table and linked list memory structures, and a working example of how an input data sequence may be handled using a Linked List Control Unit. LLCU 180 (FIG. 5) may be a control unit that manages a 'K'-length memory (Link List Memory) in parallel and in a coordinated manner with the 'K'-length data memory 150. The simple example of FIG. 10 uses K=5 and A=2, so that the hash table memory 130 has ten cells with addresses (hashes) designated 0 to 9, and the LL memory 140 has 5 cells labeled 0 to 4. As explained earlier, a purpose of LLCU 180 is to supply free handles ('free_handle'), keep the hash table memory 130 clean and prioritize which I2H links will be deleted and which will be long living.

As illustrated, each cell in link list memory 140 may contain three fields; a 'next_handle' indicating a handle directly succeeding a current handle written in that cell, 'previous_handle' indicating a handle directly preceding the current handle, and 'hash'. Recall that by definition, the address of each cell in data memory 150 is its 'handle'. The next_handle and the previous_handle are control pointers that are used by LLCU 180 for dynamically reordering the list, illustrated by operations Move Forward, Link Forward and Delete Backward. In general, data events may be written to, and read from, the data memory 150 in a FIFO manner. However, if an event arrives corresponding to the same pixel address as one currently stored in data memory 150 (from a previous event), LLCU 180 may essentially perform an overwrite of the previous pixel data in data memory 150, and a dynamic reordering of the data memory. This is illustrated in FIG. 10.

An allocation (write) example is given in FIG. 10 with link list memory 140 in size 5 (K=5). An input sequence of 100, 45, 37, 63, 45, 13, 53 and 43 is applied, where each number represents an index corresponding to a new event received in the sequence from DVS 110. That is, each number of the input sequence is a binary sequence identifying the pixel address of the event. The pixel value of the event is correspondingly stored in data memory 150. (Data memory 150 may actually store the entire packet from DVS 110, as discussed earlier.) From the example, it can be seen that when linked list memory 140 is full, then the next Link Forward operation leads to a preliminary operation of Delete Backward that clears the corresponding hash cell in hash table memory 130. (A strike-out of a number indicates that data is erased from the cell.) This cleaning operation keeps hash table memory 130 with at most 5 occupied cells in the example. Moreover it can be seen that, if some index already exists in the list then LLCU 180 changes the control pointers such that practically that index will be promoted towards the head of the list ('Move Forward' operation). In the example, the index 45 was received again before the previous entry for 45 was read out (before it was "FIFO'd" out). This results in the previous data for index 45 being erased, and the control pointers next_handle and previous_handle changing to reflect the erasure. It is seen that in response to the index 45 arriving for the second time at hash 5, the prev_handle in the second cell (with a handle of 1) changes from 0 to 3, and next_handle is erased. This is also reflected in the prev_handle and next_handle for some of the other cells. As a result, the data memory 150 effectively holds the new event for index 45 in the temporally newest position rather than in a temporally older position for eventual FIFO-based readout.

In the above examples, input addresses of pixels were used as examples of asynchronous addresses. Thus, in these examples, a pixel is used as an example unit of an image element, such that image data processing and buffering is performed at the pixel level. Alternatively, an input address can be an input address of a larger image element such as a group of pixels, and processing and buffering may be performed in units of pixel groups rather than single pixels.

The present technology as described above may exhibit certain advantages. In accordance with the present technology, HW oriented algorithms which are based on sparse asynchronous event based data (e.g. the output of a Dynamic Vision Sensor) may consume much less memory and use small memories very efficiently. The present technology may be implemented on dedicated HW and most of its functionality can be parallelized. It may be configured to function, in the sense of an interface, like a regular memory with read/write ports, where its fetching and allocation time is equal and balanced for each request—since it is not based on a memory search like many conventional methods (e.g., binary search tree (BST), memory caching etc.) for implementing sparse matrices on software. In at least some implementations of the present technology, the complexity for allocating or fetching an index is O(1)—as expected from regular memory.

In the block diagrams and description above, the terms "circuit", "circuitry", "hardware" or "computational hardware" can be substituted for "unit" and "block". Thus, for example, "control unit" can be interchangeably called "control circuitry", "a control circuit", "control hardware", etc. Each of the afore-described units (e.g. control unit 200, hash table control unit 300, linked list control unit 180) and other computational blocks such as allocator and fetcher 320, patch indexes calculator 802, Bit O&N block 804, bit permutations block 902, normalization block 906, etc., is comprised of hardware which includes circuitry for performing the respective functions. The hardware may be either special purpose hardware or general computational (e.g. processing) hardware or a computer that has been programmed to execute a program, by reading instructions from a memory. In the latter case, the general purpose hardware/computer is transformed into a special purpose hardware/computer.

Exemplary embodiments of the present technology have been described herein with reference to signal arrows, block diagrams and algorithmic expressions. Each block of the block diagrams, and combinations of blocks in the block diagrams, and operations according to the algorithmic expressions may be implemented by dedicated computational/control hardware or such hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block/schematic diagram. For instance, control unit 100 may be embodied as a processor and may execute computer program instructions read from such a computer readable medium to implement the above-described operations.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The above-described methods according to the present technology can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A virtual frame buffer comprising:
   a hash table memory;
   a data memory; and
   control circuitry configured to:
   receive an input address of an asynchronous image data event;
   determine a pseudo-randomly computed hash of the hash table memory at which to store the input address; and
   link the hash to a handle of the data memory where data of the image data event is stored.

2. The virtual frame buffer of claim 1, wherein the input address comprises cell coordinates of one or more image collection cells in a dynamic vision sensor.

3. The virtual frame buffer of claim 1, further comprising a linked list memory that stores the hash at a same handle as that of the data memory, and stores at least one control pointer in association with the hash, for facilitating dynamic reordering of the data memory.

4. The virtual frame buffer of claim 3, wherein the at least one control pointer comprises a next handle and a previous handle of the data memory, at which data of a next data event and a preceding data event are stored, respectively.

5. The virtual frame buffer of claim 3, wherein each of the data memory and the linked list memory has K cells and the hash table memory has AK cells, where A>1.

6. The virtual frame buffer of claim 5, wherein A is in the range of 1.5 to 3, and the control circuitry maintains the hash table memory with at least (A−1)K empty cells to enable a high probability of successful allocation for new event_data.

7. The virtual frame buffer of claim 1, wherein the control circuitry determines the pseudo-randomly computed hash of the hash table memory by:
   computing plural hash candidates corresponding to the input address; and
   determining an available hash in the hash table memory among the hash candidates.

8. The virtual frame buffer of claim 7, wherein the hash candidates are computed using a Galois linear feedback shift register.

9. An image processing system comprising:
   a dynamic vision sensor (DVS) configured to output asynchronous data events;
   a virtual frame buffer; and
   a processing and storage system;
   wherein the virtual frame buffer comprises: a hash table memory; a data memory; and control circuitry configured to receive an input address of an asynchronous image data event of the DVS, determine a pseudo-randomly computed hash of the hash table memory at which to store the input address, based on a hash function; and link the hash to a handle of the data memory where data of the image data event is stored; and wherein the processing and storage system is configured to execute a pixel processing program that sends a recent event search command, corresponding to a pixel address, to the virtual frame buffer to search for a recent event at that pixel address, and the virtual frame buffer responds with a recent event search result obtained by searching hashes of the hash table for the pixel address using the hash function, and outputting image data from the data memory corresponding to the pixel address if found in the searched hashes.

10. The image processing system of claim 9, wherein the dynamic vision sensor, the virtual frame buffer, and the processing and storage system are part of a computer vision system.

11. The image processing system of claim 9, wherein the input address is an address of a pixel of the DVS, and the control circuitry is further configured to:
  generate hash candidates for each of a plurality of DVS pixels in a patch, the patch being defined as including the pixel at the input address located in a predetermined position of the patch; and
  link at least one other hash of the hash table memory, based on the hash candidates, to at least one other handle of the data memory where simulated data related to the image data event is stored.

12. The image processing system of claim 11, wherein the simulated data was previously generated by the processing and storage system and written into the data memory.

13. The image processing system of claim 11, wherein the control circuitry determines a pseudo-randomly computed hash of each of the pixels in the patch through the use of a hash candidate mask that defines how hash candidates are shared among the pixels of the patch.

14. The image processing system of claim 11, wherein the hash candidate mask enables sharing of hash candidates among pixels outside the patch.

15. The image processing system of claim 9, wherein the pixel processing program executes a video noise reduction algorithm and determines whether the recent event is noise, wherein:
  the recent event is determined to be noise if it is detected as an isolated event; and
  the isolated event is detected if no other recent events, or a number of events less than a predetermined threshold within a predetermined recent time period, are detected within a local environment of the pixel address.

16. A frame buffering method comprising:
  receiving an input address of an asynchronous data event corresponding to an image collection cell of an image sensor;
  determining a pseudo-randomly computed hash of a hash table memory at which to store the input address;
  storing at least image data of the asynchronous data event at a data memory cell defined by a handle; and
  linking the hash stored in the hash table memory to the handle.

17. The frame buffering method of claim 16, where linking the hash to the handle is performed using a linked list memory.

18. The frame buffering method of claim 17, wherein the linked list memory contains a same number of handles as the data memory, the linked list memory stores the hash at a same handle as that of the data memory, and stores at least one control pointer in association with the hash, for facilitating dynamic reordering of the data memory.

19. The frame buffering method of claim 18, wherein the at least one control pointer comprises a next handle and a previous handle of the data memory, at which data of a next data event and a preceding data event are stored, respectively.

20. The frame buffering method of claim 18, wherein each of the data memory and the linked list memory has K cells and the hash table memory has AK cells, where A>1.

* * * * *